(12) United States Patent
Mollendorf et al.

(10) Patent No.: US 7,101,607 B2
(45) Date of Patent: Sep. 5, 2006

(54) PROCESS FOR ENHANCING MATERIAL PROPERTIES AND MATERIALS SO ENHANCED

(75) Inventors: Joseph C. Mollendorf, Amherst, NY (US); David Pendergast, Hamburg, NY (US); Erik R. Bardy, Buffalo, NY (US); Sawson Samimy, Geneva, NY (US); Eric M. Stimson, North Tonawanda, NY (US); Colin K. Dauria, Syracuse, NY (US); Raymond D. Buchner, Clarence, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 52 days.

(21) Appl. No.: 10/645,726

(22) Filed: Aug. 21, 2003

(65) Prior Publication Data

US 2004/0142149 A1 Jul. 22, 2004

Related U.S. Application Data

(60) Provisional application No. 60/405,094, filed on Aug. 21, 2002.

(51) Int. Cl.
*B32B 3/12* (2006.01)
*B29C 47/00* (2006.01)
*B73C 11/04* (2006.01)
*F16L 11/00* (2006.01)

(52) U.S. Cl. .............. 428/158; 428/36.9; 428/131; 428/136; 428/312.6; 264/271.1; 156/211; 156/257; 138/137; 2/2.16

(58) Field of Classification Search .............. 428/36.9, 428/71, 158–160, 308.4, 312.2, 312.6, 402, 428/131, 136, 331; 2/2.15, 2.16; 264/239, 264/271.1; 156/211, 257; 138/137
See application file for complete search history.

(56) References Cited

U.S. PATENT DOCUMENTS

| | | | |
|---|---|---|---|
| 3,660,849 A * | 5/1972 | Jonnes et al. ............ | 2/2.15 |
| 3,856,721 A | 12/1974 | Fritschel | |
| 4,077,922 A | 3/1978 | Farrissey, Jr. et al. | |
| 4,252,378 A | 2/1981 | DeBolt et al. | |
| 4,276,341 A | 6/1981 | Tanaka | |
| 5,120,385 A | 6/1992 | Takahashi et al. | |
| 5,569,513 A * | 10/1996 | Fidler et al. ............ | 428/35.6 |
| 5,888,642 A | 3/1999 | Meteer et al. | |
| 6,284,809 B1 | 9/2001 | Plummer et al. | |
| 6,319,599 B1 | 11/2001 | Buckley | |
| 6,349,412 B1 | 2/2002 | Dean | |
| 6,389,865 B1 | 5/2002 | Easterbrook | |
| 6,451,231 B1 * | 9/2002 | Harrison et al. ......... | 264/45.3 |
| 6,633,004 B1 * | 10/2003 | Heitz et al. ............. | 174/137 A |

OTHER PUBLICATIONS

WO 99/57182, Nov. 1999, Bertrand et al.*
Herrmann et al., "Aerogels: The Leading Edge in Thermal Insulation," *H & V Engineer* 68(725):8-11 (1995).

(Continued)

*Primary Examiner*—Donlad J. Loney
(74) *Attorney, Agent, or Firm*—Nixon Peabody LLP

(57) ABSTRACT

The present invention relates to a composite insulation material. The composite insulation material includes a syntactic foam component and a plurality of aerogel inserts. The present invention also relates to a method of making a composite insulation material. The present invention further relates to a method for enhancing the flexibility of a solid material.

46 Claims, 22 Drawing Sheets

OTHER PUBLICATIONS

Lu et al., "Thermal Transport in Organic and Opacified Silica Monolithic Aerogels," *Journal of Non-Crystalline Solids* 145:207-210 (1992).

Hümmer et al., "Heat Transfer in Opacified Aerogel Powders," *Journal of Non-Crystalline Solids* 145:211-216 (1992).

Zeng et al., "Pore Size Distribution and Apparent Gas Thermal Conductivity of Silica Aerogel," *Transactions of the ASME* 116:756-759 (1994).

Lu et al., "Thermal Conductivity of Monolithic Organic Aerogels," *Science* 225:971-972 (1992).

Zeng et al., "Mean Free Path and Apparent Thermal Conductivity of a Gas in a Porous Medium," *Transactions of the ASME* 117:758-761 (1995).

Hashin, "Assessment of the Self Consistent Scheme Approximation: Conductivity of Particulate Composites," *J. Composite Materials* 2(3):284-300 (1968).

Benveniste, "Effective Thermal Conductivity of Composites with a Thermal Contact Resistance Between the Constituents: Nondilute Case," *J. Appl. Phys.* 61(8):2840-2843 (1987).

Ohsawa et al., "A Study of Composite Foams for Diving Suits Subjected to High Hydrostatic Pressure," *J. of Appl. Polymer Science* 23:1233-1245 (1979).

Chan et al., "Conductance of Packed Spheres in Vacuum," *Transactions of the ASME-Journal of Heat Transfer* 95:302-308 (1973).

Wawryk et al., "The Influence of Microsphere Diameter on the Coefficient of Thermal Conductivity of Microsphere Insulation," *Cryogenics* pp. 441-443 (Aug. 1983).

Baudot et al., "Thermal Conductivity of a RTV Silicone Elastomer Between 1.2 and 300 K," *Cryogenics* 38(2):227-230 (1998).

Hatta et al., "Thermal Conductivity of Coated Filler Composites," *J. Appl. Phys.* 59(6):1851-1860 (1986).

Benveniste, "A Differential Effective Medium Theory With a Composite Sphere Embedding," *Transactions of the ASME-Journal of Applied Mechanics* 54:466-468 (1987).

Cabot Corporation, Product Information Sheet for Nanogel™ Fine Particle Aerogel, 2 pp. (2002).

Cabot Corporation, Product Information Sheet for Nanogel™ Aerogel Beads, 2 pp. (2002).

Silicones, Inc., Material Safety Data Sheet for Product Name: P-10A, 2 pp. (1999).

Silicones, Inc., Material Safety Data Sheet for Product Name: P-10B, 2 pp. (1999).

Silicones, Inc., Material Safety Data Sheet for Product Name: GI-245 A, 2 pp. (1998).

Silicones, Inc., Material Safety Data Sheet for Product Name: GI-245 B, 2 pp. (1998).

Silicones, Inc., Price Sheet for RTV-2 Silicone Rubber, 1 page (1997).

Silicones, Inc., Product Information Sheet for GI-184B/GI-Thixotropic Activator, 2 pp. (1996).

Dow Corning Corporation, Product Information Sheet for Dow Corning® 832 Multi-Surface Adhesive Sealant, 2 pp. (1997).

Dow Corning Corporation, Material Safety Data Sheet for Dow Corning® 3145 RTV Adhesive/Sealant—Gray, pp. 1, 3, 5, and 7 (revision date Feb. 15, 2002).

3M Performance Enhancement Sheet for 3M® Microspheres Engineered for a Wide Choice of Unique Enhancements, 8 pp. (1998).

Aspen Aerogels, Inc., Material Safety Data Sheet for ASP-USB Silica Aerogel Beads, 4 pp. (2001).

Dow Corning Corporation, Material Safety Data Sheet for Dow Corning® Q3-6611 Adhesive, Gray, pp. 1, 3, 5, and 7 (revision date Jan. 22, 2002).

3M, Product Information Sheet for 3M® Z-Light Spheres® Ceramic Microspheres Gray Grades, pp. 1 and 3 (2000).

Grealish et al., "State-of-the-Art on Deep Water Thermal Insulation Systems," *Proceedings of OMAE'02, 21st International Conference on Offshore Mechanics and Artic Engineering*, Olso, Norway, pp. 339-347 (Jun. 23-28, 2002).

Wang et al., "Syntatic Foam Thermal Insulation for Ultradeep High Temperature Applications," *Proceedings of OMAE'02, 21st International Conference on Offshore Mechanics and Artic Engineering*, Oslo, Norway, pp. 155-166 (Jun. 23-28, 2002).

Kyo, "Effective Thermal Conductivity of Composite Foam," *Heat Transfer-Japanese Research* 23(3):258-276 (1994).

Wawryk et al., "Heat Transfer in Microspehere Insulation," *Journal of Thermal Analysis* 34:249-257 (1988).

Lu et al., "Thermal Transport in Opacified Monolithic Silica Aerogels," *12 ETPC Proceedings* 23:431-436 (1991).

Hrubesh et al., "Thermal Properties of Organic and Inorganic Aerogels," *J. Mater. Res.* 9(3):731-738 (1994).

Rowe, "Final Report, N00298-69-Q-K786, Development of a Flexible Swimsuit Material for 600 Ft. Salt Water Depths," including reports on Phases I (Nov. 1969), II (Apr. 1970), and III (Jun. 1971), Emerson & Cuming, Inc., Dielectric Materials Division, Canton, MA, 26 pp. (Jun. 1971).

Norris et al., "A Generalized Differential Effective Medium Theory," *J. Mech. Phys. Solids* 33(6):525-543 (1985).

Audet et al., "Development and Evaluation of Deep-Sea Swimsuit Materials," Technical Report No. 108, Navy Clothing and Textile Research Unit, Natick, MA, Work Unit No. 523-003-01, 61 total pages (including attachments) (1973).

Miwa et al., "Thermal Conductivity and Flexural Rigidity of Composite Foam for Wet Suit Usable Under High Static Hydraulic Pressure," 41(5):T-189 to T-195 (1985) (English abstract and figure legends).

\* cited by examiner

PROCESS FOR ENHANCING MATERIAL PROPERTIES AND MATERIALS SO ENHANCED

This application claims the benefit of U.S. Provisional Patent Application Ser. No. 60/405,094, filed Aug. 21, 2002, which is hereby incorporated by reference in its entirety.

The subject matter of this application was made with support from the United States Government under the Office of Naval Research (ONR), Grant No. N00014-02-1-0278. The U.S. Government may have certain rights.

FIELD OF THE INVENTION

The present invention relates to a composite insulation material, a method for making the composite insulation material, and products that contain the composite insulation material. The present invention also relates to a method for enhancing the flexibility of a solid material, and a solid material so enhanced by the method.

BACKGROUND OF THE INVENTION

It is rare that a single material will have all (or even several) of the typically desired characteristics for a particular application. A classic example is that strong materials are typically heavy. Another example is that the best thermal insulators (e.g., solid aerogels) are typically rigid, fragile, and have attendant low density. Such issues lead to classical "design trade-offs" and encourage the development of new materials at the microscopic level. Alternately, materials can be processed or treated at the macroscopic level to enhance desirable properties while attempting to minimize the undesirable "side effects" of the process or treatment. Although the process or treatment is at the macroscopic level, the resultant changes are typically at the microscopic level. A classic example is heat treating metals to increase hardness, usually at the expense of increased brittleness.

Thus, it is well known that one specific material does not typically possess all of the desired and/or required characteristics for a particular application. For example, high strength is often at the expense of high weight, high density, high rigidity and incompressibility. Another example is thermal insulation, which has low thermal conductivity, typically at the expense of compressibility; which, in turn, lowers its effective thermal resistance. Composite materials attempt to alleviate this by combining materials with desirable properties for a particular application. There usually remain, however, undesirable "side-effects" (design trade-offs). To illustrate further, a comparison is made between two types of thermal insulation, namely: foamed neoprene and syntactic foam.

Foamed neoprene is currently used for underwater diver thermal insulation. It is a good insulator because it contains small "pockets" of gas trapped in closed internal cells. Since gas has a low thermal conductivity, foamed neoprene is a good insulator as long as the closed internal cells retain their integrity, including their volume of gas. However, as a diver goes to increasing depth in water, the associated and inevitable increase in local hydrostatic pressure compresses the gas trapped in the closed internal cells. This reduces their volume and the foamed neoprene is said to "go flat." Since the thermal resistance is the thickness divided by the thermal conductivity, this causes dual disadvantages inasmuch as its thickness is reduced and its effective thermal conductivity is increased. That is to say, its insulating capability is reduced (often unacceptably) by two mechanisms.

Syntactic foam is a composite material composed of a matrix material and a filler material. One use of syntactic foam is for thermal insulation in high-pressure environments, such as thermally insulating deep-ocean oil pipelines. For this application, the matrix material is typically plastic and the filler material is typically hollow micro- and/or macro-spheres. The hollow micro- and/or macro-spheres may be gas-filled or evacuated. The matrix material serves to hold-in-place the relatively low thermal conductivity hollow micro- and/or macro-sphere filler material. As the volume fraction of the filler material increases, the effective thermal conductivity of the syntactic foam decreases, i.e., the effectiveness of the insulation increases. This is done, however, at the expense of increased stiffness. This increased stiffness is a distinct disadvantage of syntactic foam in that it does not conform well to contours, unless it is molded-in-place. Furthermore, as the volume fraction of lower conductivity inclusions is increased, to increase its insulation capability, current syntactic foam suffers from a decrease in flexibility. In other words, the better the insulation, the stiffer it becomes. This makes it unsuitable for insulation when flexibility is required—such as for: insulating contours, clothing and underwater diver thermal protection. The differences in thermal resistance between foamed neoprene and syntactic foam are even more striking. They would amount to about a six-fold advantage of the syntactic foam at depth of 350 feet of sea water. Currently, the stiffness of syntactic foam makes it impractical for use in garments such as dive suits.

The present invention is directed to overcoming these and other deficiencies in the art.

SUMMARY OF THE INVENTION

The present invention relates to a composite insulation material. The composite insulation material includes a syntactic foam component and a plurality of aerogel inserts embedded within said syntactic foam component. The present invention also relates to various products containing the composite insulation material.

The present invention also relates to a method of making a composite insulation material having opposing first and second surfaces. Suitable composite insulation materials made by this method contain a syntactic foam component (i.e., cured) and a plurality of aerogel inserts embedded within the syntactic foam component. One aspect of this method involves providing a syntactic foam component. Thereafter, a plurality of aerogel inserts are embedded within the syntactic foam component to yield a composite insulation material. Another aspect of this method involves providing a syntactic foam component precursor (i.e., non-cured). A plurality of aerogel inserts are contacted within the syntactic foam component precursor. The syntactic foam component precursor with the plurality of aerogel inserts contacting the precursor is then cured under conditions effective to yield a composite insulation material.

The present invention further relates to a method for enhancing the flexibility of a solid material. This method involves providing a solid material having opposed first and second surfaces. Thereafter, a plurality of incisions and/or indentations can be introduced into the first and/or second surfaces of the solid material, thereby enhancing the flexibility of the solid material.

The present invention involves combining several materials such that the desirable characteristics of each material are exploited, while the effects of their undesirable characteristics are minimized. Macroscopically, this is embodied in the presently described invention by arranging materials in a combination of series and/or parallel "flow pathways." For example, the "flow pathways" may represent heat flow and/or stress flow conduits.

The present invention overcomes the disadvantage of stiffness by adding a stress relief pattern to one or both surfaces of the syntactic foam. The stress relief pattern can include one or more arrays of incisions and/or indentations formed in the syntactic foam. In one embodiment of this invention, the relief pattern is incorporated by cutting and/or indenting either completely or partially through one or both surfaces of the syntactic foam without materially removing a significant amount of material. In another embodiment, material is removed and replaced with the same (and/or another) material, but the replaced material may or may not be securely affixed. Rather the replaced material can be "free-floating." The incisions and/or indentations increase the flexibility and decrease the durability and strength of the syntactic foam. Laminating a suitably stretchable and durable material to one or both sides of the stress-relieved syntactic foam compensates for the attendant loss of durability and strength of the syntactic foam caused by the incisions and/or indentations.

The materials produced by the present invention have numerous advantages relative to the current state of the art, including the following advantages: (1) enhanced material properties, such as improved flexibility; (2) retained desirable properties; (3) waterproof; (4) essentially incompressible; (5) excellent abrasion resistance; and (6) lower durometry than unprocessed syntactic foam.

DETAILED DESCRIPTION OF THE INVENTION

The present invention relates to a composite insulation material. The composite insulation material includes a syntactic foam component and a plurality of aerogel inserts embedded within the syntactic foam component. Preferably, the composite insulation material of the present invention is a flexible composite insulation material.

The syntactic foam component can include an elastomeric matrix and a filler dispersed substantially throughout the elastomeric matrix. Suitable elastomeric matrices can include, without limitation, silicone, rubber, or any other material that exhibits elastomeric properties. Exemplary elastomeric matrices include, without limitation, GE LIM6010 (GE Silicones, Waterford, N.Y.), GE RTV615 (GE Silicones), GE RTV400T (GE Silicones), SI P10 (Silicones, Inc., High Point, N.C.), and SI G245 (Silicones, Inc.).

The elastomeric matrix can also include a plasticizer. The plasticizer can be present in an amount suitable to produce the desired plasticity for the intended use of the composite insulation material. Typically, the plasticizer is present in an amount by volume of between about 5 and about 50 percent of the syntactic foam component, preferably between about 10 and 30 percent. One suitable plasticizer for use in the present invention is polymethylsiloxane. Other suitable plasticizers can be from the GE SF96 series (GE Silicones) of plasticizers.

Figure 1:
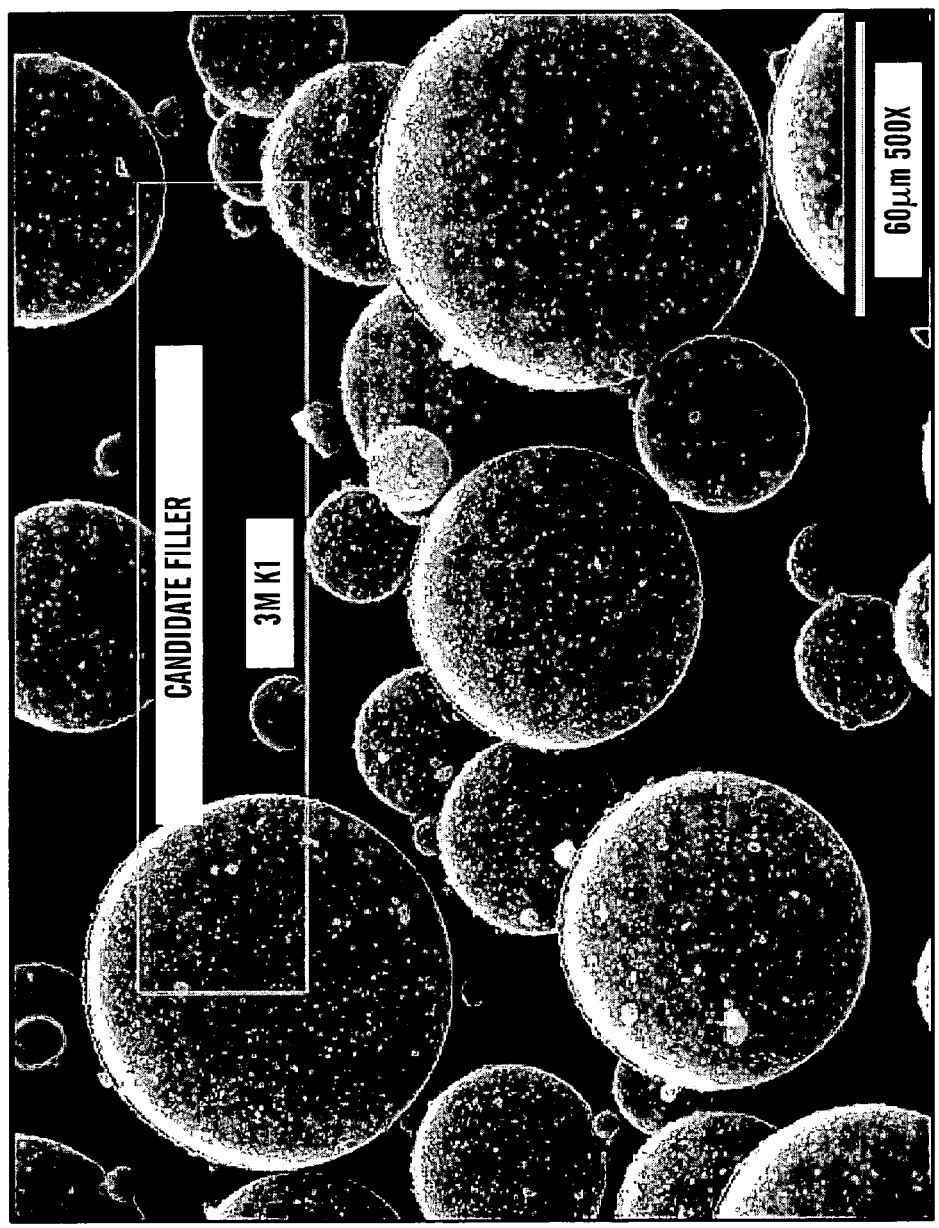
FIG. 1 is a micrograph showing 3M™ K1 glass microspheres at a magnification of 500×.
Figure 2:
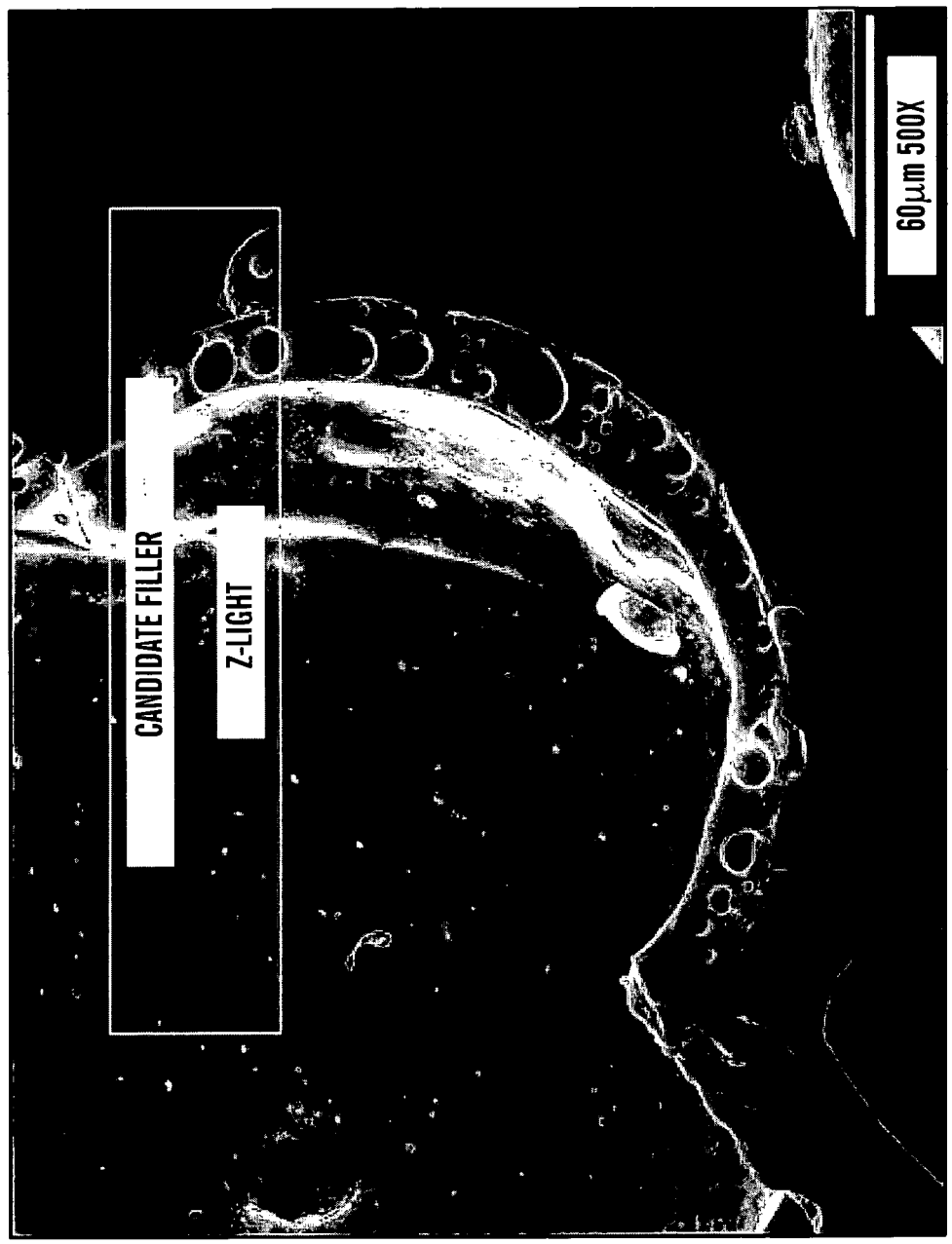
FIG. 2 is a micrograph showing Z-Light ceramic microspheres at a magnification of 500×.
Figure 3:
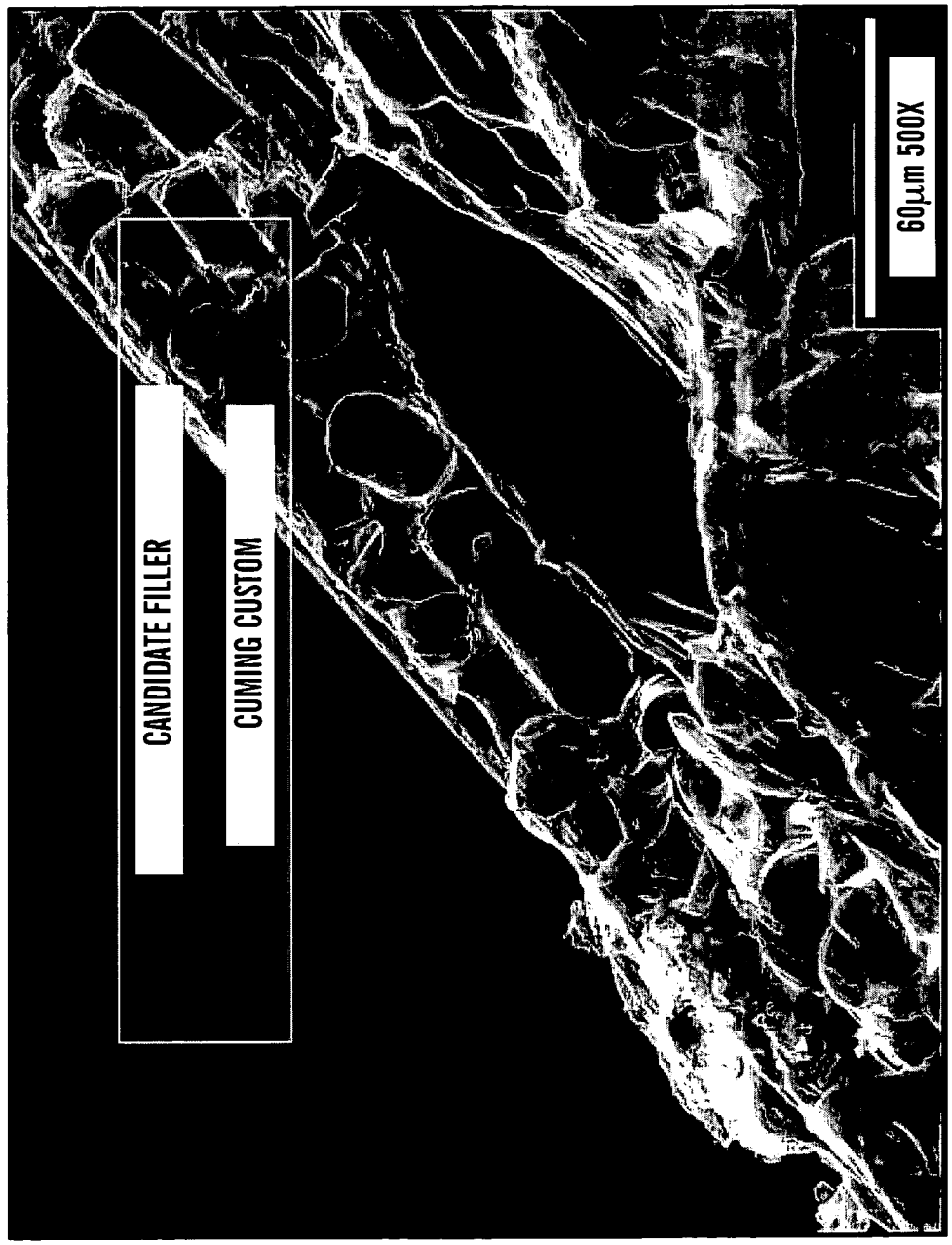
FIG. 3 is a micrograph showing CUMMING CUSTOM™ microspheres at a magnification of 500×.

The filler can include a plurality of microspheres. The plurality of microspheres can be present in an amount suitable to produce the desired degree of insulation for the intended use of the composite insulation material. Typically, the plurality of microspheres are present in an amount by volume of between about 10 and about 70 percent of the syntactic foam component, preferably between about 30 and about 50 percent. Suitable microspheres for use in the present invention can include, without limitation, glass microspheres, plastic microspheres, and a combination of glass and plastic microspheres. The microspheres typically have a diameter of between about 20 and about 5,000 micrometers, although smaller or larger diameter microspheres may be desirable in certain applications. Exemplary microspheres include, without limitation, 3M K1 (3M Performance Materials, St. Paul, Minn.) (FIG. 1), 3M Z-Light (3M Performance Materials) (FIG. 2), EXPANCEL™ 551DE (Akzo Nobel, Sundsvall, Sweden), DUALITE™ MS7050 (Sovereign Specialty Chemicals, Inc., Chicago, Ill.), Emerson Cuming Custom 3–5 mm (Emerson & Cuming Composite Materials, Inc., Canton, Mass.) (FIG. 3), and Sil-Cell™ (Sibrico Corp., Hodgkins, Ill.).

In one particular embodiment, the syntactic foam component can include an elastomeric matrix and a plurality of microspheres, where the elastomeric matrix contains both silicone and a plasticizer.

A suitable syntactic foam component can have a thickness of between about 2 and about 25 millimeters, although larger or smaller syntactic foam components can be prepared depending on their ultimate use.

The aerogel inserts can include, for example, silica, and in particular synthetic amorphous silica. Exemplary aerogel inserts include, without limitation, ASPEN™ aerogel blanket fragments (Aspen Aerogels, Inc., Marlborough, Mass.), ASP-USB™ silica aerogel beads (Aspen Aerogels, Inc.), NANOGEL™ aerogel beads (Cabot Corp., Tuscola, Ill.), and NANOGEL™ fine particle aerogel (Cabot Corp.). The plurality of aerogel inserts can be present in an amount suitable to produce the desired degree of insulation for the intended use of the composite insulation material. Typically, the aerogel inserts are present in any amount by volume of between about 40 percent and about 90 percent of the composite insulation material, preferably between about 45 percent and about 80 percent.

In one embodiment, the plurality of aerogel inserts are partially embedded within the syntactic foam component. As used herein, the term "partially embedded" means that the aerogel insert is partially encapsulated within the syntactic foam component such that a portion of the aerogel insert is exposed at one of the surfaces of the syntactic foam component. In another embodiment, the plurality of aerogel inserts are fully embedded within the syntactic foam component. As used herein, the term "fully embedded" means that the aerogel insert is completely encapsulated within the syntactic foam component, such that no portion of the aerogel insert is exposed at any of the surfaces of the syntactic foam component (but for, perhaps, at incisions and/or indentations as described hereinafter). In yet another embodiment, some of the plurality of aerogel inserts are partially embedded and some of the plurality of aerogel inserts are fully embedded within the syntactic foam component. Further, the plurality of aerogel inserts can be substantially non-uniformly or uniformly embedded (i.e., dispersed) within the syntactic foam component.

The composite insulation material thus far described can be considered to the core component, as referenced below as the "composite insulation material core."

A suitable composite insulation material of the present invention can have opposed first and second surfaces (i.e., top and bottom or inner and outer surfaces, depending on the intended use of the composite insulation material). According to one structural formation thereof, the composite insulation material can have two opposed substantially planar surfaces. For example, if the first surface is one of the two substantially planar surfaces, then the second surface is the other of the two substantially planar surfaces of the composite insulation material.

In one embodiment, the composite insulation material can further include a laminate layer substantially covering the first surface of the composite insulation material core (i.e., a first laminate layer) and/or a laminate layer substantially covering the opposed second surface of the composite insulation material core (i.e., a second laminate layer). As used herein, the term "laminate layers" generically means either or both of the first and second laminate layers. The first and second laminate layers can be the same or different, and can each include, for example, a nylon/spandex laminating compound, a lycra laminating compound, and/or a neoprene rubber laminating compound. Exemplary laminate layers include, without limitation, Ultrex Lycra, Neoprene rubber, nylon Spandex (e.g., 78 percent nylon and 22 percent Spandex), and thin gauge silicone rubber (e.g., 0.010 inch gauge). Suitable laminate layers for use in the present invention typically have a thickness of between about 200 and about 500 micrometers, although thinner or thicker laminate layers can also be employed. A composite insulation material containing either or both of the laminate layers can have a thickness of between about 2 and about 25 millimeters.

The composite insulation material can further include an adhesive layer between the first laminate layer and the first surface of the composite insulation material core (i.e., a first adhesive layer) and/or an adhesive layer between the second laminate layer and the second surface of the composite insulation material core (i.e., a second adhesive layer). The first and second adhesive layers can be the same or different and can each be a silicone-based adhesive. Exemplary adhesives include, without limitation, AQUASEAL™ (Trondak, Inc., Monroe, Wash.), NEO-REZ™ (NeoResins, Wilmington, Mass.), PERMATEX-CLEAR™ RTV silicone sealant (Permatex, Inc., Hartford, Conn.), PERMATEX-BLUE™ silicone gasket maker (Permatex, Inc.), SHOE GOO™ (Eclectic Products, Eugene, Oreg.), Dow Corning 832 multi-surface adhesive/sealant (Dow Corning Corp., Midland, Mich.), Dow Corning 3145 RTV adhesive/sealant (Dow Corning Corp.), Dow Corning Q3-6611 adhesive (Dow Corning Corp.), and Dow Corning 756 silicone building sealant (Dow Corning Corp.). Further, the first and second adhesive layers typically have a thickness of between about 200 and about 500 micrometers, although thinner or thicker adhesive layers can be applied depending on the choice of adhesives.

The composite insulation material can further include a fluid impervious membrane between the composite insulation material core and the first laminate layer, the composite insulation material core and the second laminate layer, or both. As used herein, the term "fluid impervious membrane" means any substance that is impenetrable by fluids and is suitable for substantially covering the first and/or second surfaces of the composite insulation material core, and particularly for substantially covering any exposed portion of an aerogel insert embedded within the syntactic foam component. An example of a preferred fluid impervious membrane includes silicone rubber sealant or adhesive.

Figure 4A:
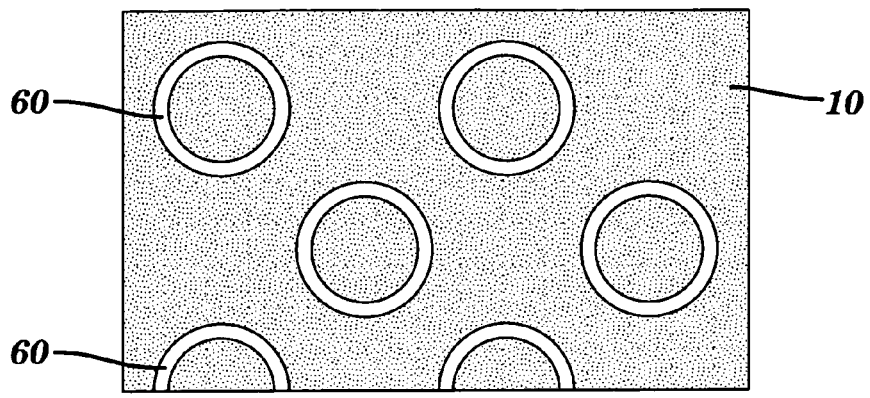
FIGS. 4A–4C show various views of a circular incisions into a syntactic foam component.
Figure 4B:
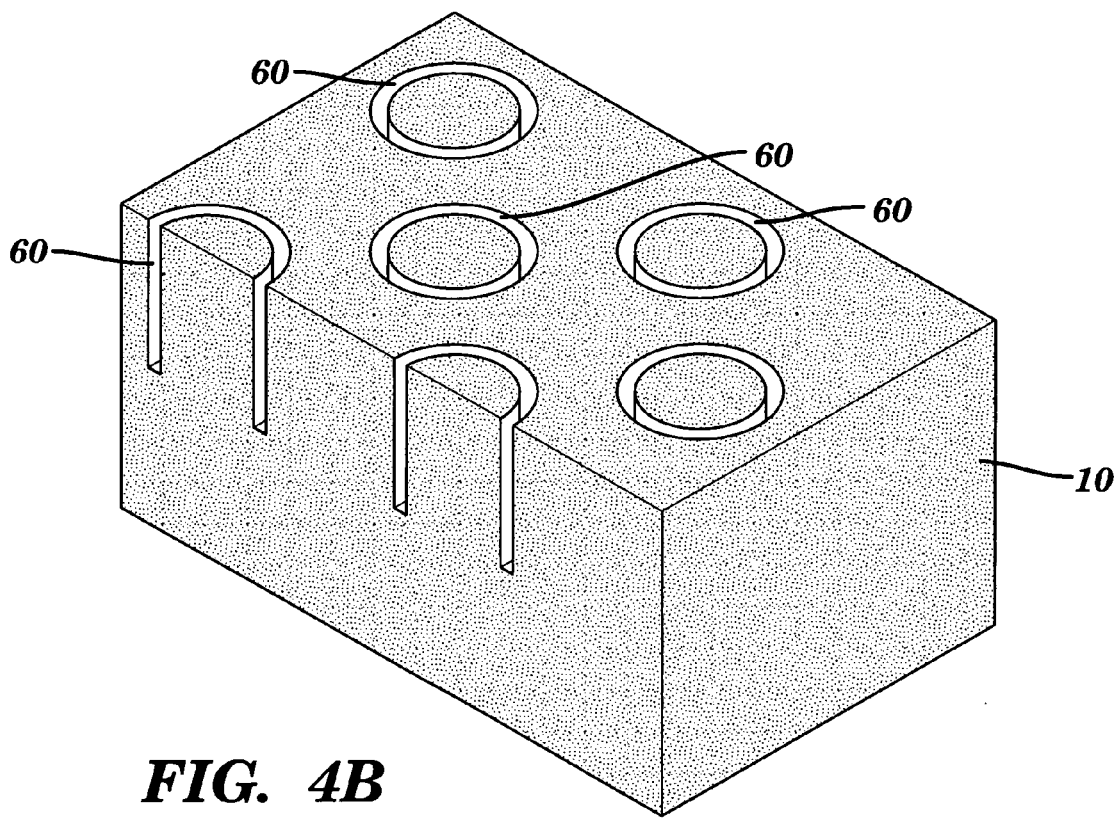
Figure 4C:
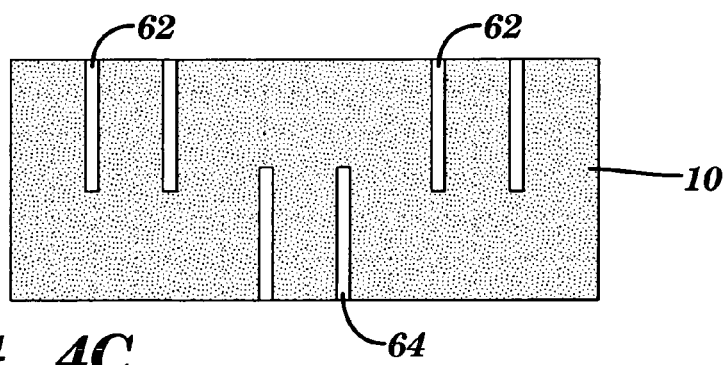
Figure 5A:
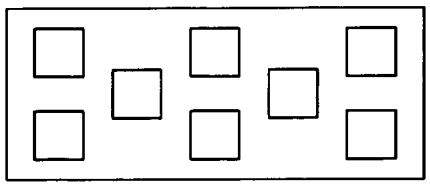
FIGS. 5A–5L show top views of various types of suitable shapes of incisions and/or indentations for use in the present invention.
Figure 5B:
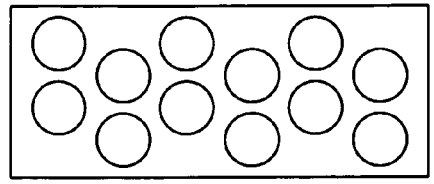
Figure 5C:
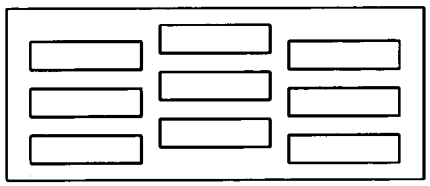
Figure 5D:
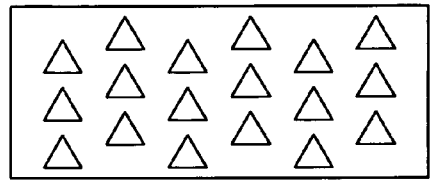
Figure 5E:
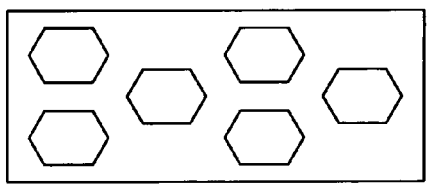
Figure 5F:
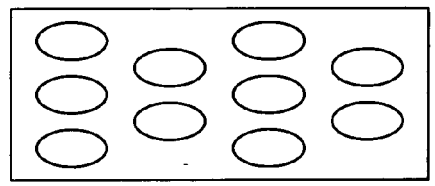
Figure 5G:
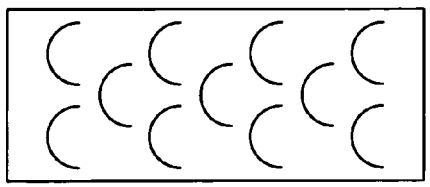
Figure 5H:
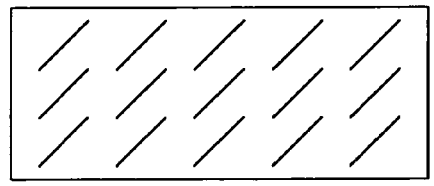
Figure 5I:
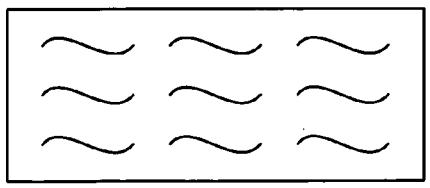
Figure 5J:
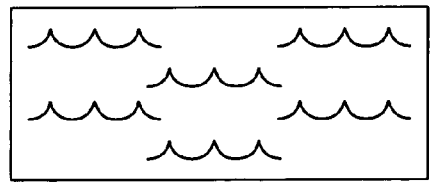
Figure 5K:
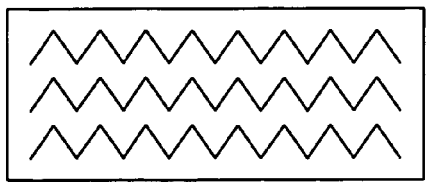
Figure 5L:
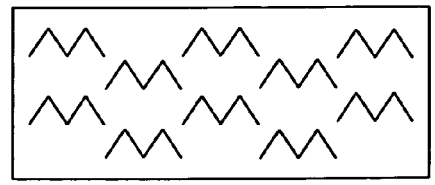

The composite insulation material can further include a plurality of incisions and/or indentations formed into the first surface and/or the second surface, or extending between the first and second surfaces, of the composite insulation material core. As used herein, the term "incision" means any closed cut into the first and/or second surface of the composite insulation material core (before or after the aerogels are embedded within the syntactic foam component) that has a closed inner boundary, and which therefore encloses the portion of the composite insulation material core that is contained within the inner boundary of the cut. The closed cut incision is illustrated in FIGS. 4A–4C. FIG. 4A shows a top view of a plurality of circular incisions 60 into the surface of syntactic foam component 10. FIG. 4B is a three-dimensional view illustrating the enclosed portion of the syntactic foam component 10 (which could also be of the composite insulation material core in other embodiments) resulting from a plurality of circular incisions 60. FIG. 4C is a side view of syntactic foam component 10 and showing incision 62 into the first surface of syntactic foam component 10 and incision 64 into the second surface of syntactic foam component 10. Suitable examples of such incisions include, without limitation, various types of shapes such as a square (FIG. 5A), a circle (FIG. 5B), a rectangle (FIG. 5C), a triangle (FIG. 5D), any other polygon (FIG. 5E), and an oval (FIG. 5F). As used herein, the term "indentation" means any linear formed or cut into the first and/or second surface of the composite insulation material (before or after the aerogels are embedded within the syntactic foam component) that does not have a closed inner boundary, and which therefore cannot enclose any portion of the composite insulation material within a closed inner boundary. Suitable examples of such indentations include, without limitation, a semi-circle (FIG. 5G), a straight line (FIG. 5H), a curved line (FIG. 5I), a wavy line (FIG. 5J), and a zigzagged line (FIGS. 5K and 5L). The incisions and indentations can be used in any combination. Incisions that extend between the first and second surfaces of the composite insulation material result in complete cut-outs of the portion of the composite insulation material enclosed within the inner boundary of the incision. In one embodiment, the patterned incisions and/or indentations are of the same shape. In another embodiment, the patterned incisions and/or indentations are of at least two different shapes.

Figure 6A:
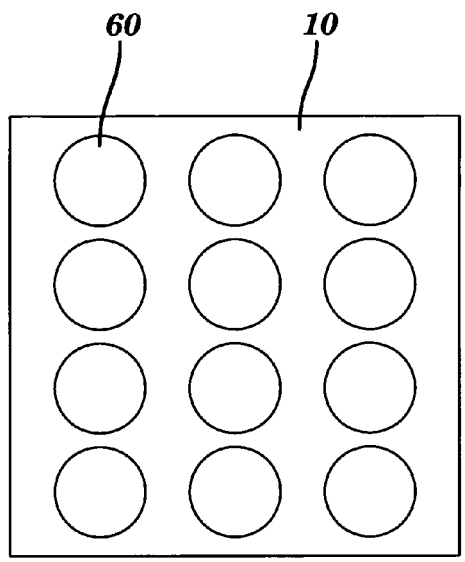
FIGS. 6A–6D show top views of various suitable arrays of incisions/indentations of the present invention.
Figure 6B:
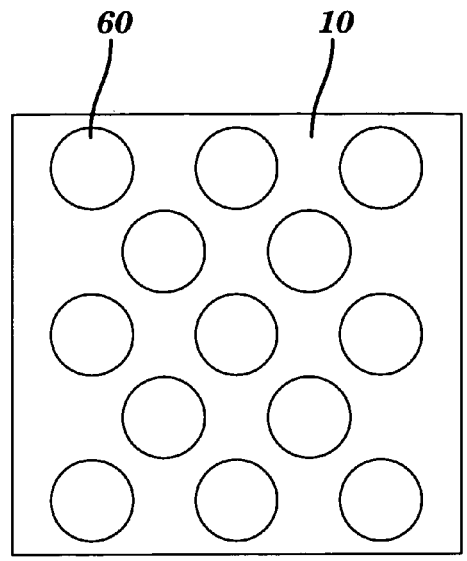
Figure 6C:
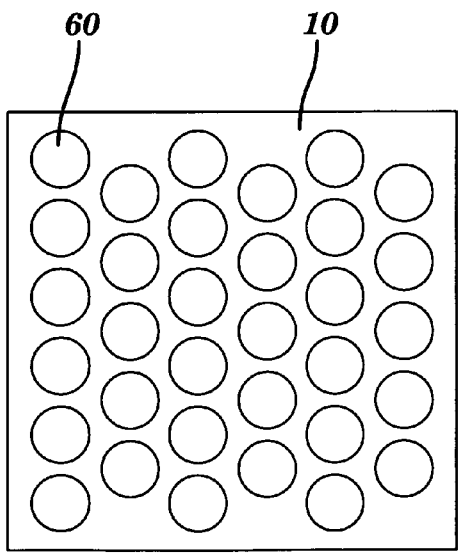
Figure 6D:
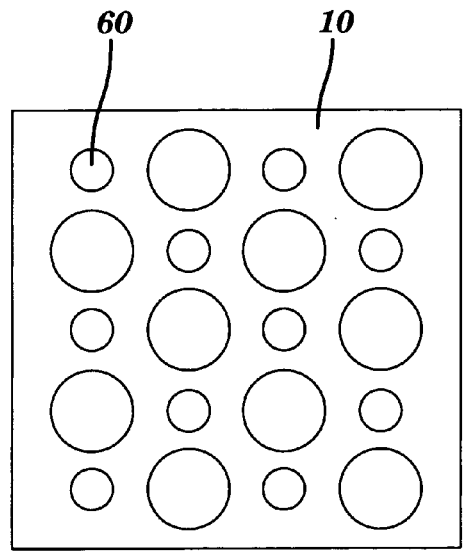
Figure 7A:
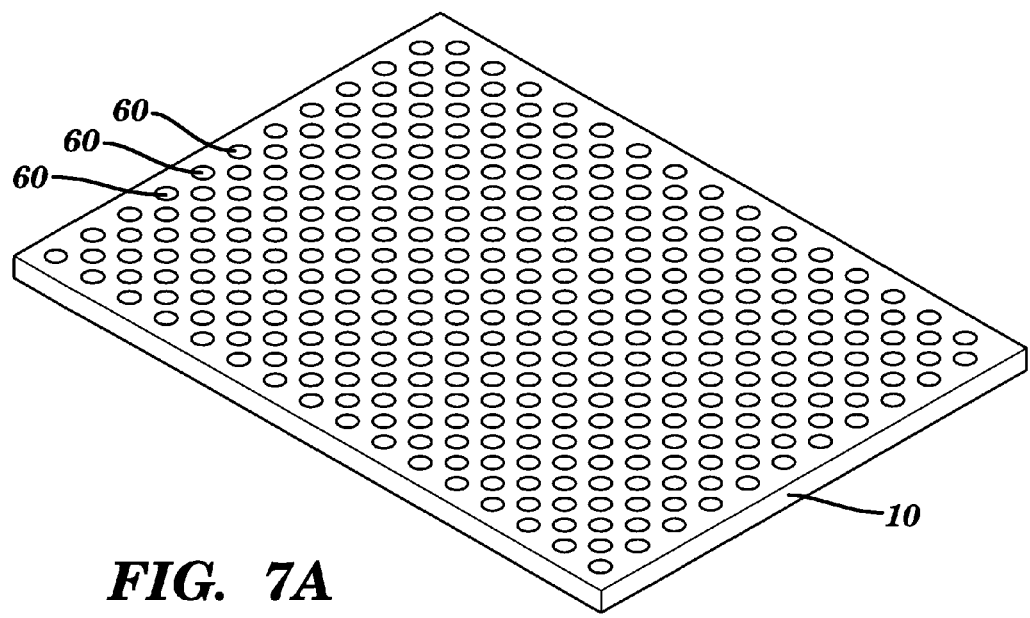
FIGS. 7A–7B shows various suitable arrays of circular incisions (FIG. 7A) and semicircular indentations (FIG. 7B) for use in the present invention.
Figure 7B:
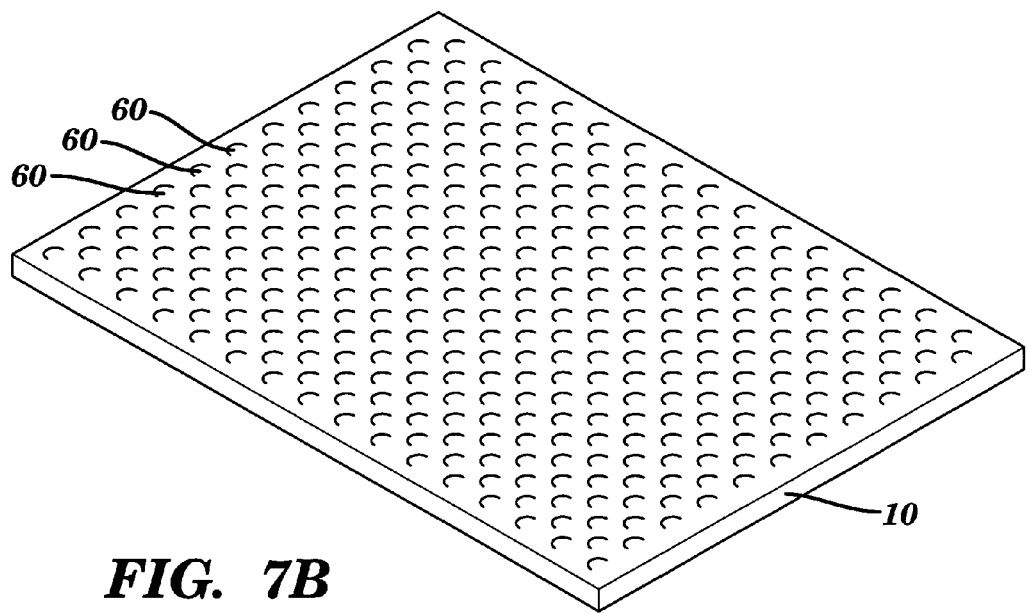

The plurality of incisions and/or indentations can be at a depth of between about 10 and about 100 percent of the thickness of the composite insulation material core. The plurality of incisions and/or indentations can also have a width of not greater than about 25 times the thickness of the composite insulation material core. The plurality of incisions and/or indentations can be of non-uniform depth and width. Additionally, the plurality of incisions and/or indentations can be arranged in either a uniform or non-uniform array. FIGS. 6A–6D show various types of arrays of circular incisions/indentations 60 into the syntactic foam component 10 (or into the composite insulation material), including a completely uniform array (FIG. 6A), a staggered array (FIGS. 6B and 6C), and a modified staggered array of different sized incisions (FIG. 6D). FIG. 7A shows a staggered array of circular incisions 60 (FIG. 7A) into syntactic foam component 10, while FIG. 7B shows a staggered array of semicircular indentations 60 into syntactic foam component 10. The composite insulation material core can contain a plurality of incisions and/or indentations that have the same shape or that include at least two different shapes of incisions and/or indentations. The various types of incisions/indentations can be arranged in various arrays to produce homogenous or non-homogenous results, which could result in desirable anisotropic behavior, i.e., different properties in different directions. This could result in, for example, more or less flexibility in mutually perpendicular directions.

The various views of embodiments of the composite insulation material of the present invention and its various components are illustrated in FIGS. 10A–10C, FIGS. 11A–11C, and FIGS. 12A–12D, as described more fully below.

Figure 10A:
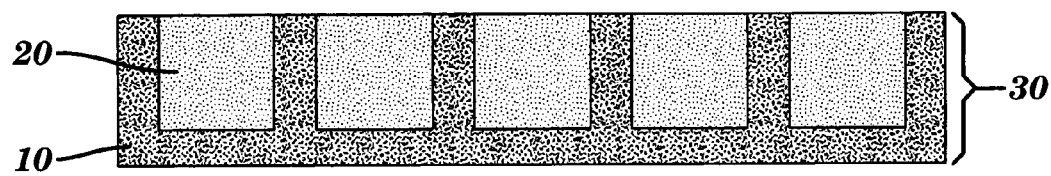
FIGS. 10A–10C show cross-sectional views of various embodiments of the composite insulation material of the present invention.
Figure 10B:
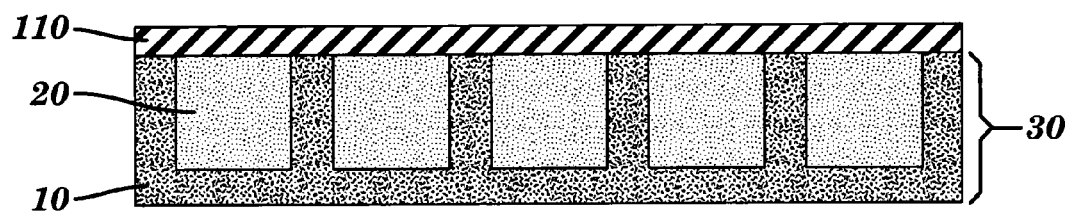
Figure 10C:
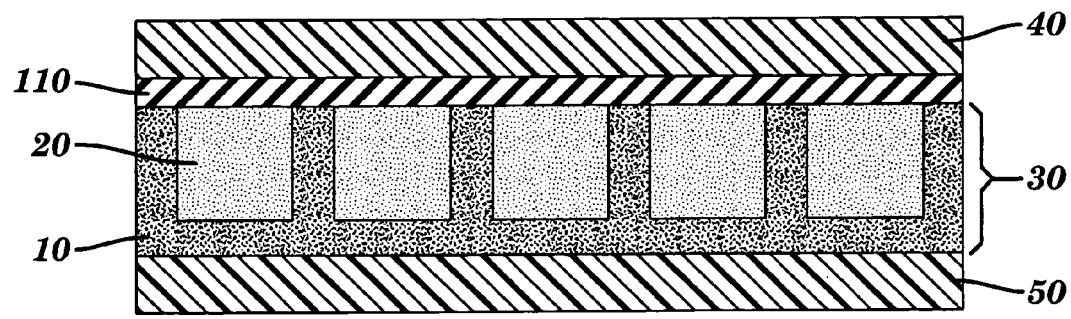

FIGS. 10A–10C show cross-sectional views of various portions composite insulation material 30. FIG. 10A: This shows a plurality of aerogel inserts 20 partially embedded within syntactic foam component 10 to form composite insulation material 30. FIG. 10B: This shows a fluid impervious membrane 110 coating a surface of composite insulation material 30, and substantially covering the exposed portion of the plurality of aerogel inserts 20 that are partially embedded within syntactic foam component 10. FIG. 10C: This shows further shows a first laminate layer 40 applied to the first surface of composite insulation material 30 (which first surface has deposited thereon the fluid impervious membrane 110), and a second laminate layer 50 applied to the second surface of composite insulation material 30.

Figure 11A:
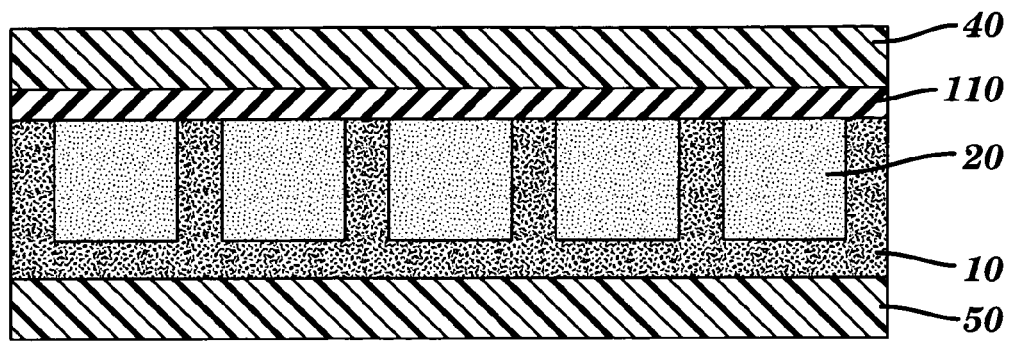
FIGS. 11A–11C show cross-sectional views of various embodiments of the composite insulation material of the present invention.
Figure 11B:
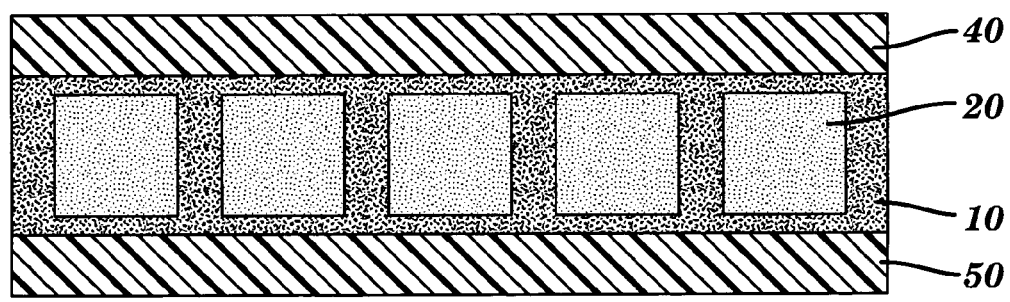
Figure 11C:
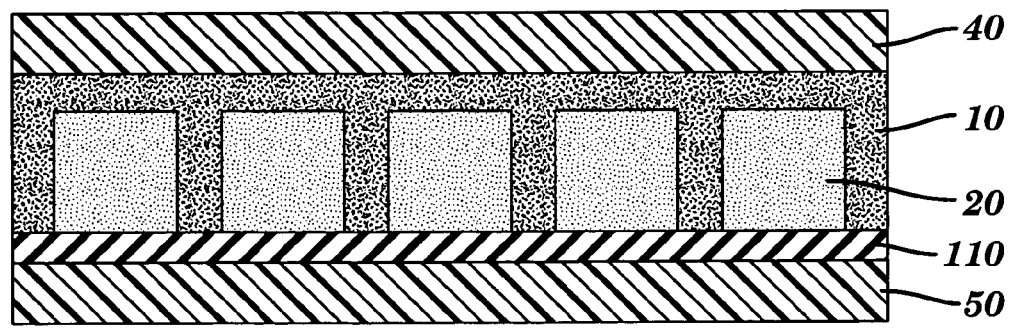

FIGS. 11A–11C show cross-sectional views of various embodiments of the composite insulation material of the present invention, and particularly illustrates examples of how the plurality of aerogel inserts 20 can be embedded within the syntactic foam component 10. FIGS. 11A and 11C show partially embedded aerogel inserts 20, with the aerogel inserts partially exposed at either the first surface (FIG. 11A) or at the second surface (FIG. 11C) of the composite insulation material. The composite insulation materials shown in FIGS. 11A and 11C also include a first laminate layer 40, a second laminate layer 50, and an fluid impervious membrane 110. FIG. 11B shows a composite insulation material that includes fully embedded aerogel inserts 20, a first laminate layer 40 and a second laminate layer 50, but not containing a fluid impervious membrane.

Figure 12A:
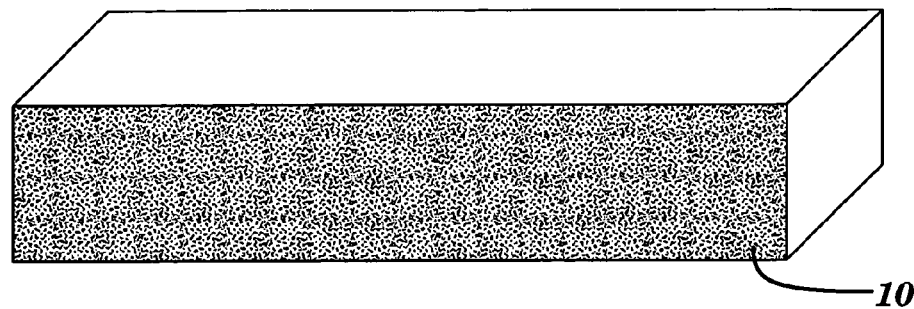
FIGS. 12A–12D show three-dimensional views of the syntactic foam component 10 composite insulation material and the aerogel inserts 20, as used in one embodiment of the present invention.
Figure 12B:
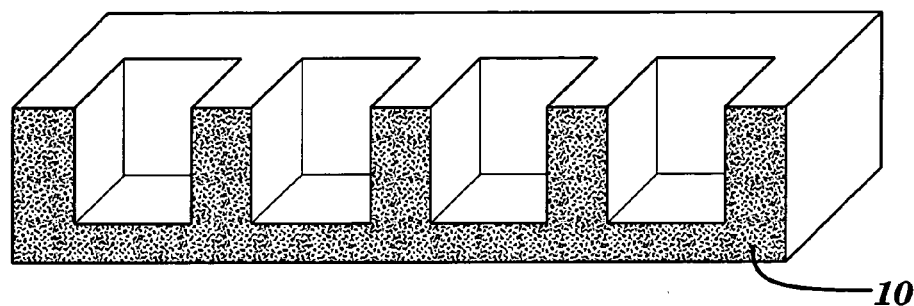
Figure 12C:
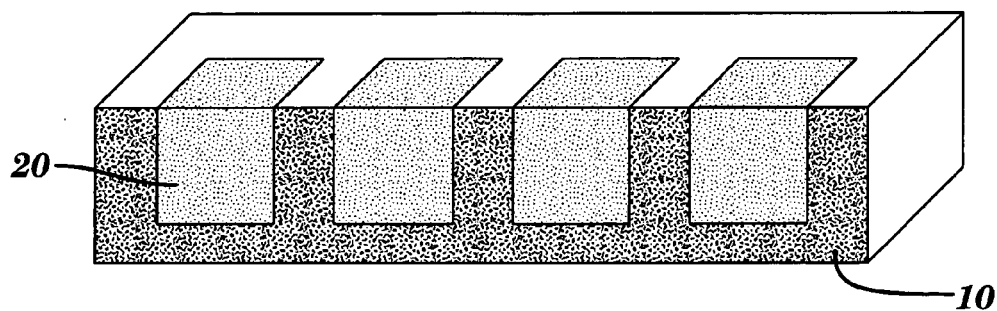
Figure 12D:
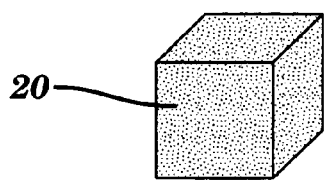

FIGS. 12A–12D are three-dimensional views illustrating one embodiment of how aerogel inserts 20 are embedded into a syntactic foam component 10. FIG. 12A shows syntactic foam component 10 prior to embedding of aerogel inserts. FIG. 12B shows syntactic foam component 10 that contains punched-out (or cut-out) portions for insertion of aerogel inserts. FIG. 12C shows aerogel inserts 20 partially embedded within syntactic foam component 10. FIG. 12D shows an aerogel insert 20 before being embedded into the syntactic foam component.

Composite insulation materials of the present invention, which are preferably flexible, are characterized by the following attributes: (1) high thermal resistance, which results from low thermal conductivity and high thickness; (2) incompressible (i.e., thickness does not decrease with increasing ambient pressure, as opposed to (perhaps local) uniaxial pressure); (3) low thermal conductivity (i.e., aerogel have among the lowest material thermal conductivities, which are of the order 0.01 W/m-K); (4) low weight/buoyancy (i.e., comparable to current foamed neoprene (RBX™) wet suits, a weight of about 4 kg and a density of about 293 kg/m$^3$); (5) swimmable (i.e., insulating garment does not impede swimming); (6) durable; (7) flexible (i.e., to facilitate swimmablity, donnability, and general wearer comfort); (8) drapeable (i.e., easily folds as a measure of "donnability"); (9) stretchable (i.e., to facilitate swimmablity, donnability, and general wearer comfort); (10) mass-manufactureable (i.e., amenable to existing, cost-effective, conventional manufacturing processes); and (11) tailor friendly (i.e., material sewable by means of blind and through stitch as provided).

Various properties can be calculated for the composite insulation material of the present invention, including, for example, the following: thermal conductivity; drapeability; tensile strength; tear strength; elastic modulus; weight/buoyancy; and density. Suitable ranges for these various properties, as they relate to the composite insulation material or its components are described below.

Thermal Conductivity: A suitable composite insulation material of the present invention can have a thermal conductivity of not more than about 50 mW/m-K, preferably between about 10 and about 50 mW/m-K, at a depth of up to about 350 feet of sea water.

Drapeability: A suitable composite insulation material of the present invention can have a drapeability parameter of between about 0.07 and about 3.36 g-m, as measured using Federal Test Method Standard Number 191A Method 5206 (i.e., stiffness of cloth, drape, and flex:cantilever bending method).

Tensile Strength: A suitable composite insulation material of the present invention can have a tensile strength of between about 0.07 and about 2.20 MPa, as measured using American Society for Testing and Materials ("ASTM") standard D412-98a (i.e., standard test methods for vulcanized rubber and thermoplastic elastomers—tension).

Tear Strength: A suitable composite insulation material of the present invention can have a tear strength of between about 0.36 and about 17.60 kN/M, as measured using ASTM standard D624-00 (i.e., standard test method for tear strength of conventional vulcanized rubber and thermoplastic elastomers).

Elastic Modulus: A suitable composite insulation material of the present invention can have an elastic modulus of between about 0.01 and about 0.221 MPa at an elongation of about 50 percent, between about 0.02 and about 0.25 MPa at about 100 percent elongation, and/or between about 0.02 and about 0.29 MPa at about 200 percent elongation, as measured using ASTM D412-98a.

Weight/Buoyancy: A suitable composite insulation material of the present invention can have a specific weight of between about 0.25 and about 0.70.

Density: A suitable composite insulation material of the present invention can have a density of between about 250 kg/m$^3$ and about 750 kg/m$^3$.

The composite insulation material of the present invention can have various attributes that make the material suitable for a variety of uses, including, without limitation, diver suit insulation, insulation for cryogenic applications, underwater pipeline insulation, and various other applications that require insulating materials, including flexible insulating materials, at any pressure.

The present invention further relates to an article of clothing containing the composite insulation material of the present invention. A suitable example is a dive suit or other waterproof garment (i.e., constructed using known patterns or templates but using the materials of the present invention). The present invention also relates to a pipeline containing the composite insulation material of the present invention.

The present invention also relates to a method of making a composite insulation material of the present invention. According to one approach, this method involves providing a syntactic foam component and embedding or inserting a plurality of aerogel inserts within the syntactic foam component to form the composite insulation material. In this approach, the syntactic foam is provided with appropriately configured recesses or blanks that are disposed to receive similarly shaped and configured aerogel inserts. According to another approach, this method involves providing a syntactic foam component precursor (i.e., non-cured). A plurality of aerogel inserts are inserted within the syntactic foam component precursor, which is then cured under conditions effective to form the composite insulation material. Suitable means for curing the syntactic foam component precursor include, without limitation, heating at between about 300 and about 350 degrees Fahrenheit for up to about one hour.

The embedding step can involve adding the aerogel inserts to the syntactic foam component under conditions effective to fully and/or partially embed the aerogel inserts within the syntactic foam component. The embedding step can be performed after curing the syntactic foam component precursor. The method of making the composite insulation material can further involve applying first and second laminate layers onto the first and second surfaces of the composite insulation material, respectively (also referred to herein as the "applying step"). Prior to the applying step, the method can also involve depositing first and second adhesive layers onto the first and second surfaces of the composite insulation material, respectively. The method of making the composite insulation material can also involve coating the first surface and/or second surface of the composite insulation material with a fluid impervious membrane.

The method further involves introducing a plurality of incisions and/or indentations into the first and/or second surface of the composite insulation material (referred to herein as "introducing the incisions/indentations"). Introducing the incisions/indentations can be carried out prior to the "embedding step" (i.e., embedding the aerogels within the syntactic foam component). Introducing the incisions/indentations can also be carried on the composite insulation material, but preferably before applying laminate layers or coating with the fluid impervious membrane. Introducing the incisions/indentations can be carried out manually. A suitable means of manually introducing the incisions/indentations can involve repeatedly pressing a cork borer into the first surface and/or the second surface of the composite insulation material. Introducing the incisions/indentations can also be carried out automatically. A suitable means for automatically introducing the incisions/indentations involves exposing the first surface and/or the second surface of the composite insulation material to a calender.

Figure 8:
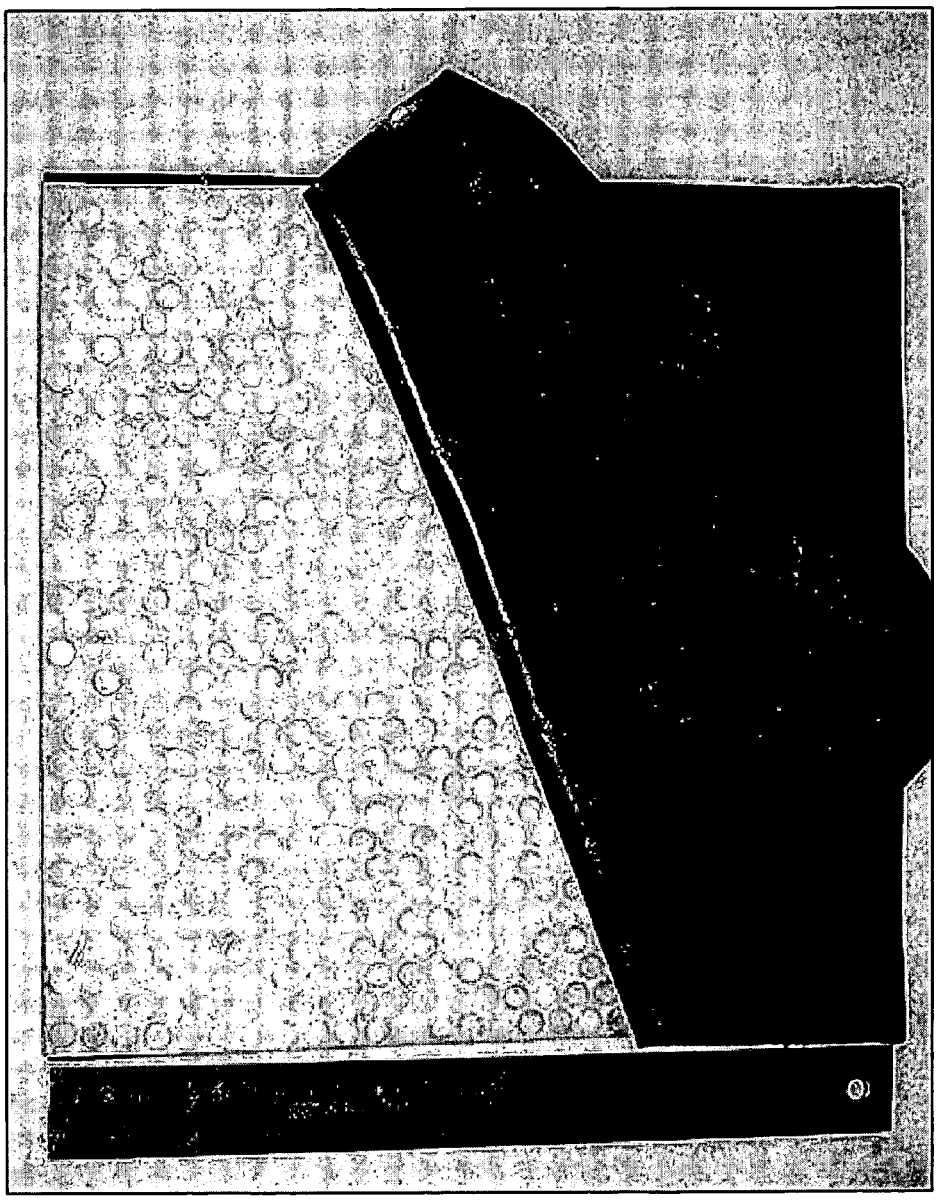
FIG. 8 shows a sample of a composite insulation material of the present invention. This example shows syntactic foam that contains a plurality of incisions that are arranged in a staggered circular punch-out pattern with thin gauge neoprene rubber as laminate.
Figure 9:
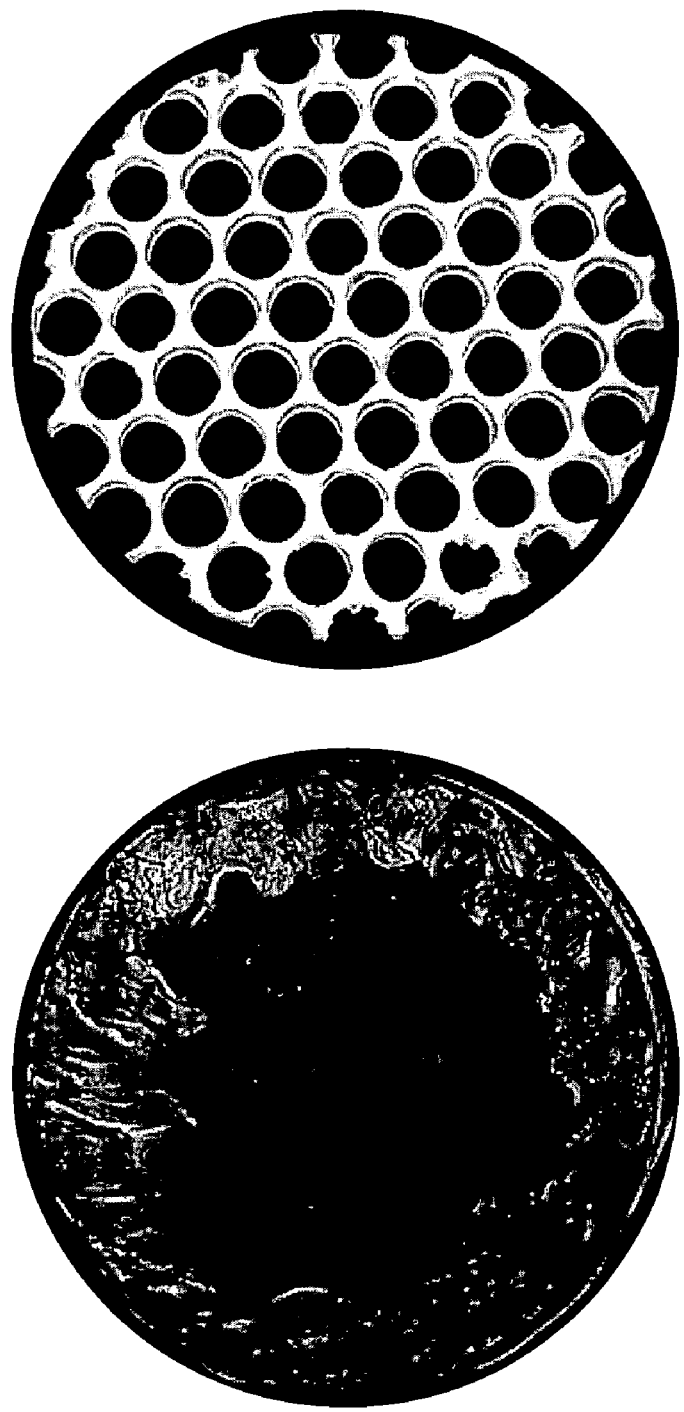
FIG. 9 shows a sample of syntactic foam component without inserts (right view) and a syntactic foam component with punch-outs filled in and covered with neoprene rubber laminate (left view).

The types of incisions/indentations (e.g., the patterns, shapes, and/or arrays) to be used can be selected to achieve either isotropic or anisotropic strength/flexibility, either locally and/or globally. In one aspect, a mass production process can be used that incorporates suitably designed rollers affixed with cutters and/or calenders arranged in a predetermined pattern. For example, as a sheet of the syntactic foam component is processed by one or more rollers, the incisions and/or indentations can be made in the syntactic foam component. Further, a follow-up process can be used to add the laminate layers of a suitably chosen material to increase the durability of the incisions and/or indentations. The processes can be either continuous or batch. An alternative embodiment involves a stamping operation. FIG. 8 illustrates an actual sample of a composite insulation material containing aerogel inserts and containing a plurality of incisions. FIG. 9 illustrates an actual sample of a syntactic foam component that does not contain aerogel inserts, but that does have punched-out portions into which the aerogel inserts can be embedded.

The present invention also relates to a composite insulation material produced according to the method described above.

The present invention further relates to a method for enhancing the flexibility of a solid material. The term "tenderizing" has been coined by the inventors to describe this method. This method involves providing a solid material having opposed first and second surfaces. Thereafter, a plurality of incisions and/or indentations can be introduced into the first and/or second surfaces of the solid material, thereby enhancing the flexibility of the solid material. Introducing the plurality of incisions and/or indentations into the solid material can be achieved as previously described herein. A suitable solid material for use in the method can be a homogenous or non-homogenous (e.g., a hybrid or composite material such as syntactic foam) material. More specifically, solid material with enhanced flexibility can be used in such materials as acoustic insulation, electrical insulation, high strength-to-weight materials, and thermal insulation. Introducing the incisions and/or indentations can be carried out manually or automatically, as already described herein. The present invention also relates to a flexible solid material produced by this method.

EXAMPLES

Example 1

Selection of Materials for Development of a Hybrid Thermal Insulation for Use in Deep Sea Diving Suits The current insulation used in NAVY diving, foamed neoprene, is a closed cell elastomeric foam. This insulation does not have sufficient thermal resistance for use in deep water. In particular, when this insulation is exposed to hydrostatic pressures of 350 feet of sea water, it compresses 70 percent. Due to this compressibility, the volume fraction of gas present in the foam insulation decreases 70 percent, thereby increasing the thermal conductivity by 200 percent. This change in thickness and thermal conductivity decreases the thermal resistance of the insulation (ratio of thickness to thermal conductivity) by 84 percent.

To overcome this inherent material flaw, various different materials have been and are being investigated to develop a new insulating material for divers. Along with the desirable thermal characteristics, the new insulation should also be flexible, stretchable, mass manufacturable, durable, and stitchable. As demonstrated below, a composite insulation material of the present invention satisfies these needs.

A composite insulation material was prepared using a syntactic foam and aerogel inserts.

The syntactic foam employed is an incompressible silicone-based composite with rigid hollow glass microspheres as fillers. The microspheres trap gas or another low thermal conductivity material such as Styrofoam in the silicone with a hard outer shell, rendering the material incompressible and thereby maintaining its thermal properties at high pressures (equivalent to 350 feet of sea water). The microspheres encapsulate sulfur dioxide gas inside a solid shell of lime glass with a diameter of 20–130 µm and a shell thickness between 0.5 and 1 µm. Although this lowers the thermal conductivity of the silicone, it does not compare to the thermal performance of foamed neoprene at atmospheric pressure. The more spheres that are mixed with the silicone the higher the modulus and more brittle the silicone becomes. Although the thermal properties of syntactic foam are not desirable, the elastic properties are with the proper amount of sphere content and plasticizer Aerogel, the second component of the composite insulation material, is a low density, highly porous material formed by extracting the liquid from a micro structured gel. The pore sizes are of the order of 10 nm in size, which is less than the mean free path of air (80 nm at STP). This reduces the transmission of heat via air conduction, and with the insertion of carbon black minimizes radiation heat transfer. The overall effective thermal conductivity of the material is ¼ of that of foamed neoprene at the surface. The form of aerogel being used in the composite insulation material is that of a flexible fiber reinforced aerogel blanket. This form of aerogel is very flexible and has a very high thermal resistance; however, due to the nature of the flexible fiber reinforcement, the material is not significantly stretchable.

To overcome this shortcoming, the composite insulation material combines the thermal performance of aerogel with the flexibility and stretchability of syntactic foam by placing a circular punch-out pattern of aerogel in a staggered formation within a matrix of syntactic foam. The volume content of aerogel present is dictated by the needed thermal performance along with attempting to maintain the same weight of conventional commercial foamed neoprene wetsuits.

The thermal behavior of these materials was studied by using a custom-designed and built thermal conductivity meter (Anter Corp. Model QuickLine-16) placed inside a compression chamber used to simulate hydrostatic pressure. The QuickLine-16 is designed in accordance with test specifications ASTM C518 and ISO DIS 8301. Thermal conductivity and thickness measurements are taken at atmospheric pressure (STP) and at incremental depths of sea water up to 350 feet (11.6 ata).

Experimental data show that the thermal conductivity of syntactic foam ranges from 0.12 W/m K (100% LIM 6010) to 0.087 W/m K (40% LIM 6010/40% K1 micropheres/20% SF96-50 plasticizer) with no change at pressure due to its incompressibility. Aerogel was measured to have a thermal conductivity of approximately 0.012–0.014 W/m-K with changes in pressure as indicated in Example 2 (below).

The thermal resistance of the hybrid is calculated by using a parallel heat flow thermal circuit yielding the following equation for thermal resistance.

$$R_h = \frac{L}{k_s(1 - v_a) + k_a v_a} \tag{1}$$

where $k_s$=thermal conductivity of syntactic foam, $k_a$=thermal conductivity of aerogel, L=thickness of hybrid insulation, $v_a$=volume fraction of aerogel.

Figure 13:
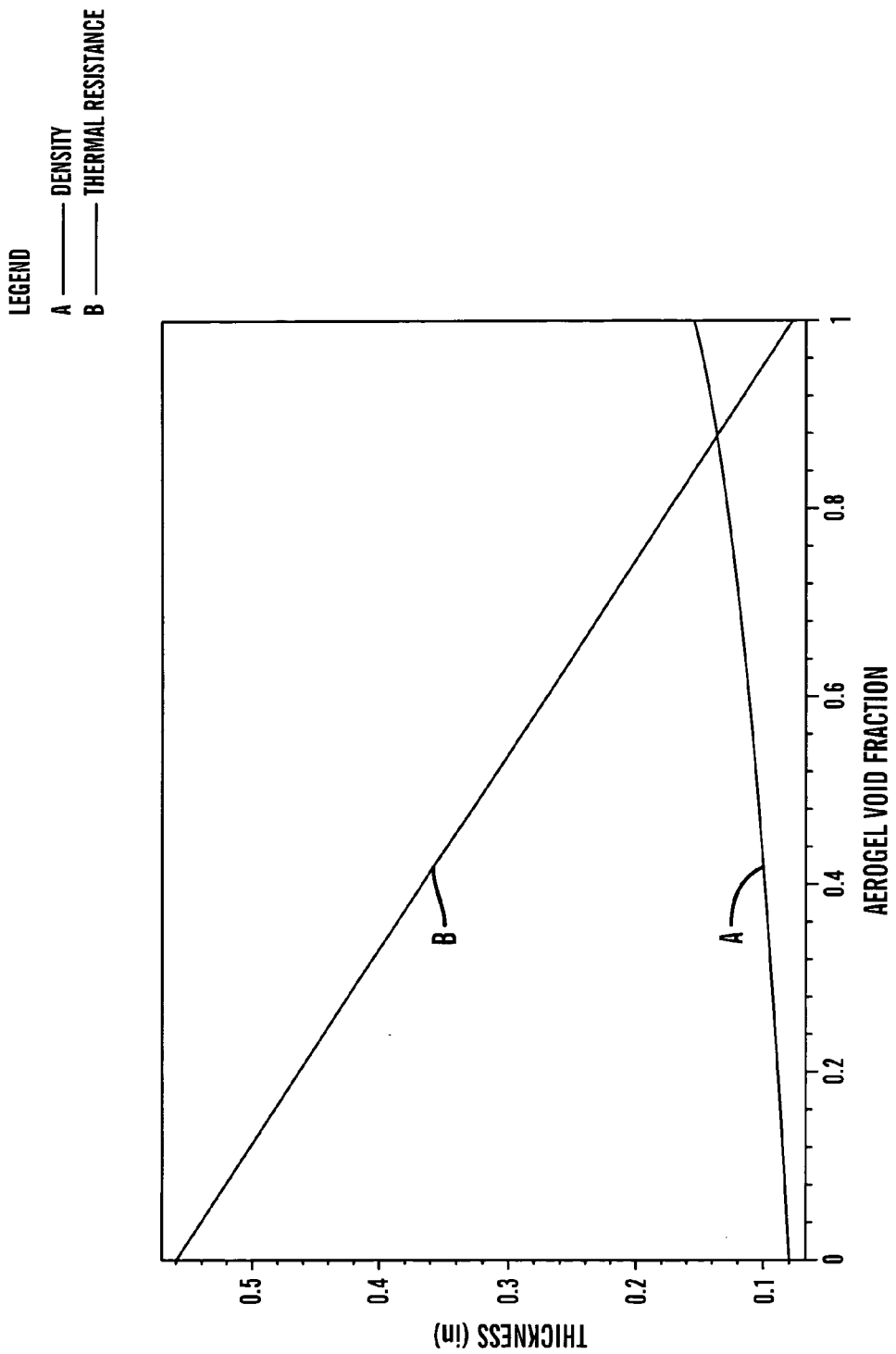
FIG. 13 is a graph showing a plot of thickness versus aerogel content based on calculations from density and thermal resistance.

The density of the hybrid insulation is calculated by the following equation:

$$\rho_h = \rho_a v_a + \rho_s(1 - v_a) \tag{2}$$

where $\rho_h$=hybrid density, $\rho_a$=aerogel density, $\rho_s$=syntactic foam density, and $v_a$=volume fraction of aerogel. In terms of mass, equation (2) can be written as:

$$m_h = [\rho_a v_a + \rho_s(1 - v_a)] A_s L \tag{3}$$

where $m_h$=mass of hybrid insulation, $A_s$=surface area of hybrid insulation, and L=thickness of hybrid insulation. In order to calculate the proper thickness, both equations (1) and (3) are solved for L and then equated. Assuming a target value for $R_h$ of 1.7 times greater than foamed neoprene and setting $m_h$ equal to the mass of foamed neoprene, an optimal amount of aerogel content of approximately 87% is calculated. FIG. 13 shows a plot of the thickness of the hybrid insulation based on thermal resistance compared to density.

With an optimal calculate amount of aerogel at 87%, varying percentages can be used to sacrifice more weight for the gain of more stretchability by lessening the amount of aerogel present. This also leads to a new target thermal resistance and thickness. Future tests of this hybrid insulation will lead to an experimentally determined amount of aerogel content where a balance is reached not only with density and thermal resistance, but with stretchability as well.

Example 2

Testing of Effective Thermal Conductivity of ASPEN™ Aerogel Blanket Under Hydrostatic Loading The total thermal conductivity can be expressed by the sum of three components: solid conductivity through the porous silica gel matrix, radiation through the voids, and conduction through the gas (Hrubesh et al., "Thermal Properties of Organic and Inorganic Aerogels," *J. Mater. Res.* 9(3):731–738 (1994), which is hereby incorporated by reference in its entirety). Due to the high porosity of aerogel the solid conductivity can be a factor of 500 times lower than in non-porous silica (Scheuerpflug et al., *J. Phys D: Appl. Phys.* 24:1395 (1991), which is hereby incorporated by reference in its entirety). The solid conductivity can thus be approximated to be proportional to the density in the following way $$k_s \propto \rho^\alpha \quad (4)$$

where $\alpha \approx 1.5$ in the density range $\rho=70-300$ kg/m$^3$ (Lu et al., "Thermal Transport in Organic and Opacified Silica Monolithic Aerogels," *Journal of Non-Crystalline Solids* 145:207–210 (1992), which is hereby incorporated by reference in its entirety). The radiative conductivity can be expressed by $$k_r = (16n^2 \sigma T_r^3)/(3\rho' K_s/\rho_s) \quad (5)$$

where $\sigma$ is the Stephan-Boltzmann constant $(5.67 \times 10^{-8}$ W/m$^2$K$^4$), n is the refractive index (~1), $T_r$ is the mean temperature of the material, and $K_s$ is the extinction coefficient for the solid (Caps et al., in *Aerogels*, Springer Proc. In Physics, edited by J. Fricke (Springer-Verlag, Germany, 1986), Vol 6, p 94, which is hereby incorporated by reference in its entirety). Equation (5) shows that the radiative component of the thermal conductivity has a strong dependence on the mean temperature and infrared absorption of the material. Insertion of an opacifier, carbon black, increases the extinction coefficient which contributes to reductions in $k_r$. (Hrubesh et al., "Thermal Properties of Organic and Inorganic Aerogels," *J. Mater. Res.* 9(3):731–738 (1994), which is hereby incorporated by reference in its entirety). The radiative conductivity becomes very significant at high temperatures. The gas conductivity through aerogel is limited due to the pore size of the silica matrix. The pore size is on average smaller than the mean free path of air at atmospheric pressure (80 nm) in free space (Zeng et al., "Mean Free Path and Apparent Thermal Conductivity of a Gas in a Porous Medium," *Journal of Heat Transfer* 117:758–761 (1995), which is hereby incorporated by reference in its entirety), which limits the motion of the gas molecules. This suppresses the convective transport of heat through the air as well as reduces the gaseous conductivity (Hrubesh et al., "Thermal Properties of Organic and Inorganic Aerogels," *J. Mater. Res.* 9(3):731–738 (1994), which is hereby incorporated by reference in its entirety).

Thermal Conductivity Data was based on four experimental trials performed on two Aspen Aerogel Blanket samples having a thickness of 18.5 mm (5-ply) and 14.4 mm (2-ply). Measurements were taken from an Anter Thermal Meter (Model Quickline™ 16) placed inside a compression chamber to simulate hydrostatic pressure. The samples were compressed incrementally to a depth of 350 FSW at a rate of 10 FSW/m. At each incremental depth 20–40 minutes was spent before taking a reading in order for steady state to be reached. All readings were taken at an average sample temperature of 20° C. Ambient temperature was maintained close to 20° C. to minimize convective losses.

Figure 14:
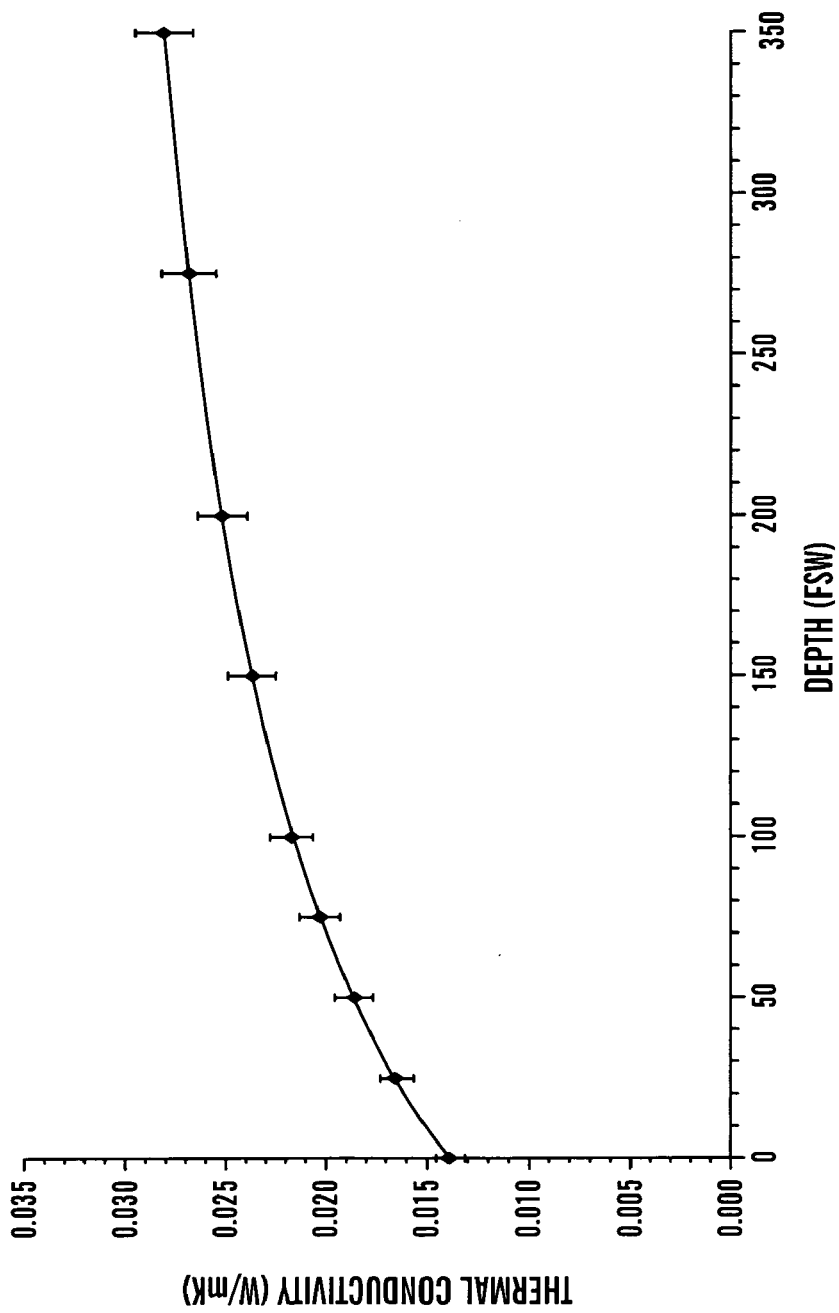
FIG. 14 is a graph showing the change in thermal conductivity (k) of ASPEN™ aerogel relative to hydrostatic pressure.

FIG. 14 shows the change in thermal conductivity (k) relative to hydrostatic pressure. The average k was experimentally measured to be 0.014 W/m-K at atmospheric pressure, and 0.028 W/m-K at 350 FSW (11.6 atm or 8821 Torr). The thickness of each sample remained constant throughout hydrostatic loading.

The increase in k during hydrostatic loading is due to the decrease of the mean free path of air at higher gas pressures. The mean free path of air is inversely proportional to pressure (Zeng et al., "Mean Free Path and Apparent Thermal Conductivity of a Gas in a Porous Medium," *Journal of Heat Transfer* 117:758–761 (1995), which is hereby incorporated by reference in its entirety). Thus, as pressure increases and the mean free path of air approaches a value that is less than the pore size of the silica matrix, the gaseous component of the conductivity becomes more significant.

Example 3

A New Hybrid Laminated Tenderized Syntactic Foam/Encapsulated Aerogel Insulation One embodiment of the composite insulation material of the present invention contains a layer of syntactic foam and an arrangement of circular aerogel blanket pieces embedded between the syntactic foam and the outermost laminations of a durable, flexible, stretchable material such as spandex. Syntactic foam is made from a suitable matrix (e.g., two-part silicone) and a suitable filler (e.g., microspheres) and plasticizers.

Syntactic foam was made by manually weighing and mixing the following components, per preferred formulation: silicone rubber components; plasticizer; and microsphere glass beads. The mixture was then evacuated (prior to cure) in a chamber to remove entrained air by reducing the chamber pressure by about 27" Hg vacuum for a period of about 20 minutes. As an example, the syntactic foam may have the following components: (1) filler (e.g., 40% by volume 3M K1 microspheres); and/or (2) matrix (e.g., 24% by volume SF96-50 plasticizer, 36% by volume LIM6010 silicone rubber).

Aerogel inserts were manually punched from stock sheets. They were then applied, in the predetermined pattern, to the top of the mold using silicone adhesive (DOW CORNING® 832). The prepared foam precursor was then poured into the mold base and the top (along with the attached aerogel) was placed into the assembly. This results in the aerogel inserts being encapsulated partially by the uncured syntactic foam. The top of the mold was secured to the base and the complete assembly was placed in an oven. The temperature was then raised to 320 F for a period of ten minutes, which completes the silicone curing process and, at the same time, partially embeds the aerogel in the syntactic foam. After curing, the mold sections were separated and the composite insulation material was removed. The one side of the aerogel which was exposed was be sealed by applying a thin layer of silicone rubber sheet material. This layer is attached by using a suitably thin layer of silicone adhesive (DOW CORNING® 3145 RTV). The final step was to apply nylon/spandex material to both sides, again using a suitably thin layer of silicone adhesive.

There are two types of laminate materials that were applied. The first was a layer of silicone rubber affixed to the aerogel exposed side of the hybrid material. The silicone layer application was accomplished by spreading a suitably thin layer of silicone adhesive (DOW CORNING® 3145 RTV) onto the laminate surface and then applying the prepared laminate to the hybrid material surface, bonding and sealing the two together. The final step of the material fabrication process is the application of an outer layer of nylon/spandex material to both hybrid surfaces using a suitably thin layer of silicone adhesive (DOW CORNING® 832), which is applied to both surfaces of the hybrid material.

The lamination material described above is a cloth-like material (e.g., lycra/spandex) placed on both sides of the hybrid core to increase surface abrasion resistance and to provide a means of holding the hybrid core together. The lamination material may be applied to the entire surface area of both sides of hybrid core.

In one embodiment, the syntactic foam/aerogel hybrid core thus produced was approximately 0.189" thick. The laminate may have the following thickness: (1) the silicone sheet, approximately 0.01" thick; and (2) nylon/SPANDEX™, approximately 0.015" thick, per side, resulting in a product that is about 0.229" thick.

The encapsulated aerogel may be aerogels that are highly porous, open-cell foam materials produced by sol-gel processes and dried by supercritical extraction. The nanosized cells/pores and particles which make up aerogels are primarily responsible for their very low thermal conduction (Hrubesh et al., "Thermal Properties of Organic and Inorganic Aerogels," *Journal of Material Research* 9:731–738 (1994), which is hereby incorporated by reference in its entirety). The pore sizes are of the same order of magnitude as the mean free path of air, thereby inhibiting the flow of heat through the pores.

Types of methods of adding stress relief patterns include manually punching (e.g., using a cork borer) by means of a guided template or by calender rolling. Calender rolling involves having the material processed between closely-spaced, rotating, opposed cylinders, which imparts a pattern onto the material between the rollers. All types of stress patterns may be used; i.e., any shape (e.g., circle, square, rectangle, triangle, polygon), typically in a staggered or in-line circular array, but it could be random. The sizes of the various patterns may vary. One example involves 0.25" to 1" circular punch outs spaced 0.05" to 0.25" apart. The patterns could be added to both syntactic foam and/or aerogel. One suitable example involves adding patterns to syntactic foam only, but there could be an advantage to adding patterns to the aerogel as well to enhance flexibility. Patterns may be added after curing of the syntactic foam.

Experimental tests have been performed for the syntactic foam material, including tensile strength (ASTM D412-98a), thermal conductivity and thickness measurements (ASTM C518, ISO DIS 8301), and drapeability (FED-STD-191A). Results of experimental tests have been acquired for mechanical properties.

To evaluate candidate insulating materials for replacement of closed-cell foamed neoprene (RBX™), each underwent tensile, tear strength, and drape tests. Based upon these tests, it was determined that GE LIM6010 silicone rubber, also referred to as UB-6010, possesses mechanical properties most similar to those of closed-cell foamed neoprene (RBX™). The 3/16" neoprene was found to have a sharper increase in stress due to a nylon fabric laminate covering either side of the specimens. The foamed neoprene had no laminate, therefore it was chosen as the benchmark. The five remaining curves represent candidate insulting materials. Of the five, UB-6010 most closely mimics the foamed neoprene's stress-strain curve.

A plasticizing agent was incorporated into the UB-6010 to achieve strains comparable to foamed neoprene. A plasticizer concentration of 10–20%, by volume, offers strains equal to that of foamed neoprene. However, as plasticizer concentration approaches 50%, the available strain can decrease by more than 50%. In addition, the elastic modulus decreases by 80% as plasticizer concentration increases from 20% to 50%.

UB-6010 with no plasticizer has a tear strength of 6.48 kN/m; compared to 6.95 kN/m for foamed neoprene. As plasticizer is added, the tear strength decreases dramatically—only 0.36 kN/m with 50% plasticizer. Despite plasticizer negatively affecting tensile strength, elastic modulus, and tear strength, it does benefit drapeability. However, UB-6010 with no plasticizer already has a flex stiffness seven times less than foamed neoprene; the higher the flex stiffness the less drapeable a material is. In conclusion, based upon mechanical properties, UB-6010 is the current best candidate for syntactic foam components amongst the potential replacement materials. To achieve mechanical properties comparable to closed-cell foam neoprene, UB-6010 should include the addition of a plasticizing agent.

The thermal properties of syntactic foam remain constant regardless of increasing hydrostatic pressure. Due to the incompressibility of syntactic foam, the thermal properties do not change with pressure. Aerogel, on the other hand, has an increase in k during hydrostatic loading due to the decrease of the mean free path of air at higher gas pressures. The mean free path of air is inversely proportional to pressure (Zeng et al., "Mean Free Path and Apparent Thermal Conductivity of a Gas in a Porous Medium," *Journal of Heat Transfer* 117:758–761 (1995), which is hereby incorporated by reference in its entirety). Thus, as pressure increases and the mean free path of air approaches a value that is less than the pore size of the silica matrix, the gaseous component of the conductivity becomes more significant.

Example 4

Analyses of Various Property Parameters of Various Candidate Materials for Use in the Composite Insulation Material of the Present Invention, Compared to Aerogel, Foamed Neoprene, and/or Syntactic Foam Although the thermal properties of syntactic foam alone are not desirable compared to foamed neoprene, the mechanical properties and incompressibility are useful in the development of a hybrid insulation. Presented below is experimental and/or theoretical data from various analyses of property parameters of candidate materials for use in the composite insulation material of the present invention and/or its components, compared to aerogel, foamed neoprene, and/or syntactic foam.

Figure 15:
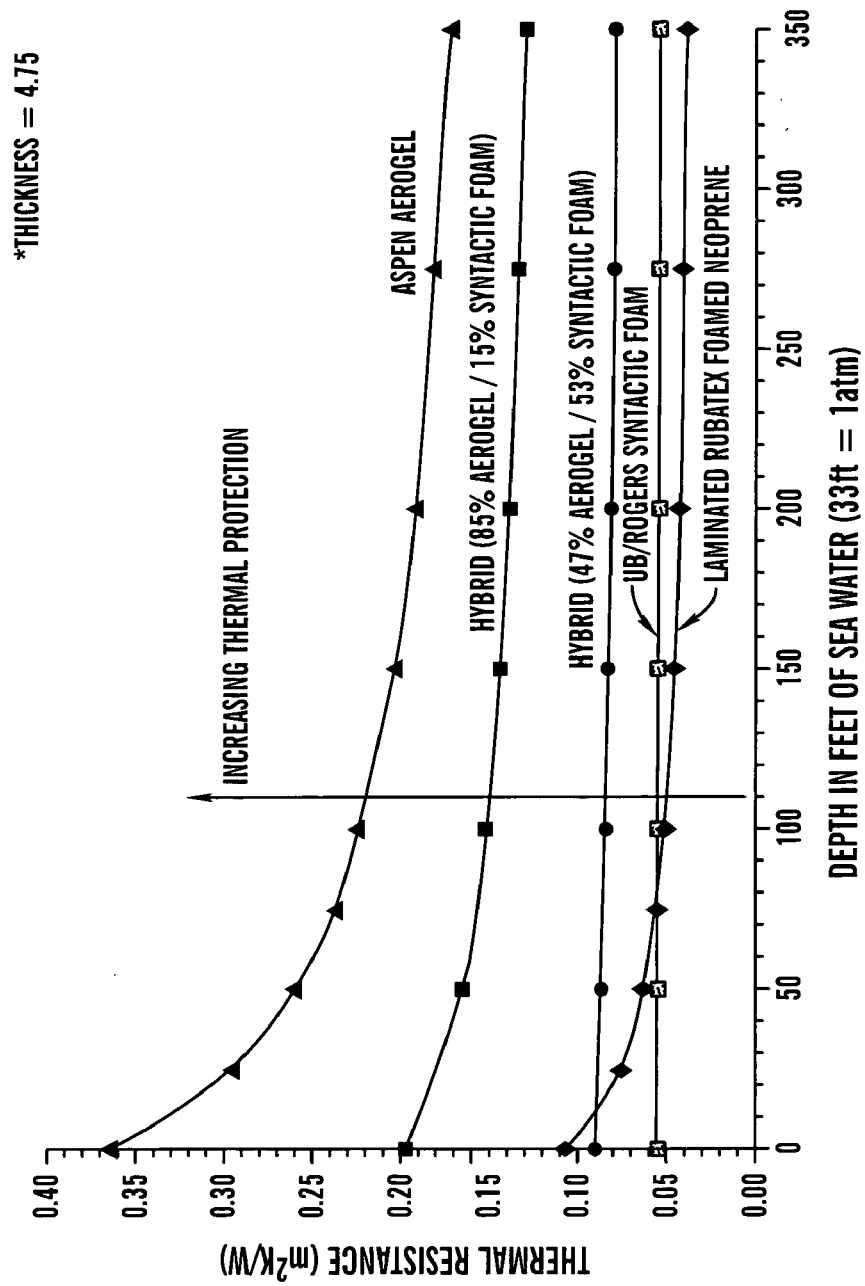
FIG. 15 is a graph showing the change in thermal resistance (thermal protection $m^2$ K/W) of various candidate materials relative to hydrostatic pressure.

FIG. 15 is a graph showing the change in thermal resistance (thermal protection m²K/W) of various candidate materials in relation to increasing pressure in depth of sea water. The graph displays experimentally measured results for foamed neoprene, ASPEN™ aerogel, and syntactic foam versus the predicted behavior of the hybrid insulation (e.g., a candidate for the composite insulation material of the present invention) at different volume content of aerogel. In particular, FIG. 15 shows the change in thermal resistance (thermal protection m²K/W) of various candidate materials in relation to increasing pressure in depth of sea water for a thickness of 4.75 mm (³⁄₁₆ inch). Due to the compression of the gas cells in foamed neoprene the thermal conductivity increases and the thickness decreases resulting in an overall decrease of thermal resistance of 84%. Due to the incompressibility of syntactic foam, the thermal properties remain constant. The aerogel on other hand decreases in thermal resistance with pressure, but even at a depth of 350 feet of sea water, the thermal resistance is still 85% greater than foamed neoprene at atmospheric pressure. The predicted values of the hybrid insulation show that the aerogel content has a significant effect on the thermal properties. At an aerogel content of 47% the hybrid is still lower in thermal resistance than foamed neoprene. At 85% aerogel content the thermal resistance is nearly twice as much as foamed neoprene at atmospheric pressure.

Figure 16:
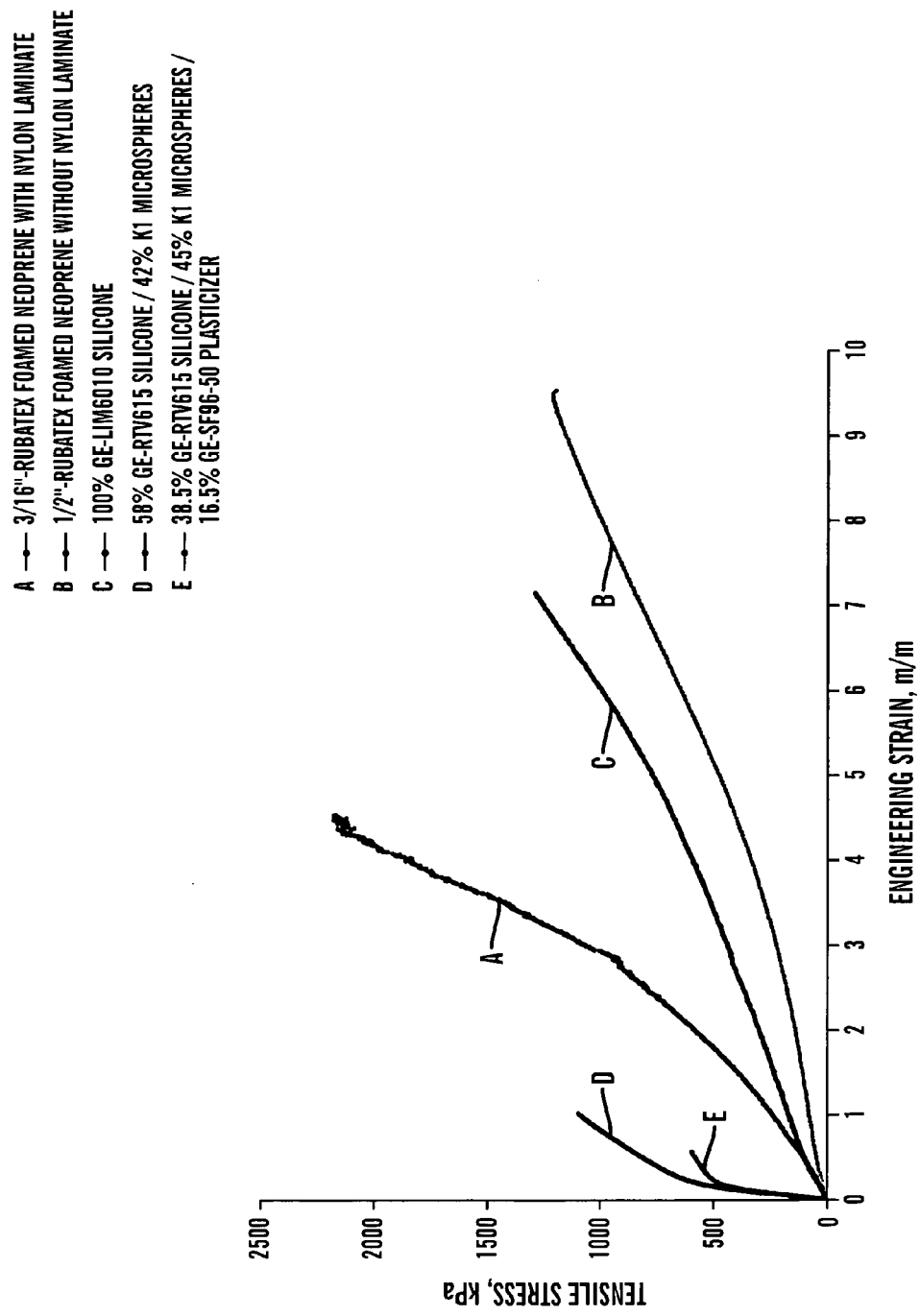
FIG. 16 is a graph showing an experimentally determined stress (MPa)-strain (m/m) curve (stretchability) for various candidate materials compared to nylon laminated and unlaminated foamed neoprene.
Figure 17:
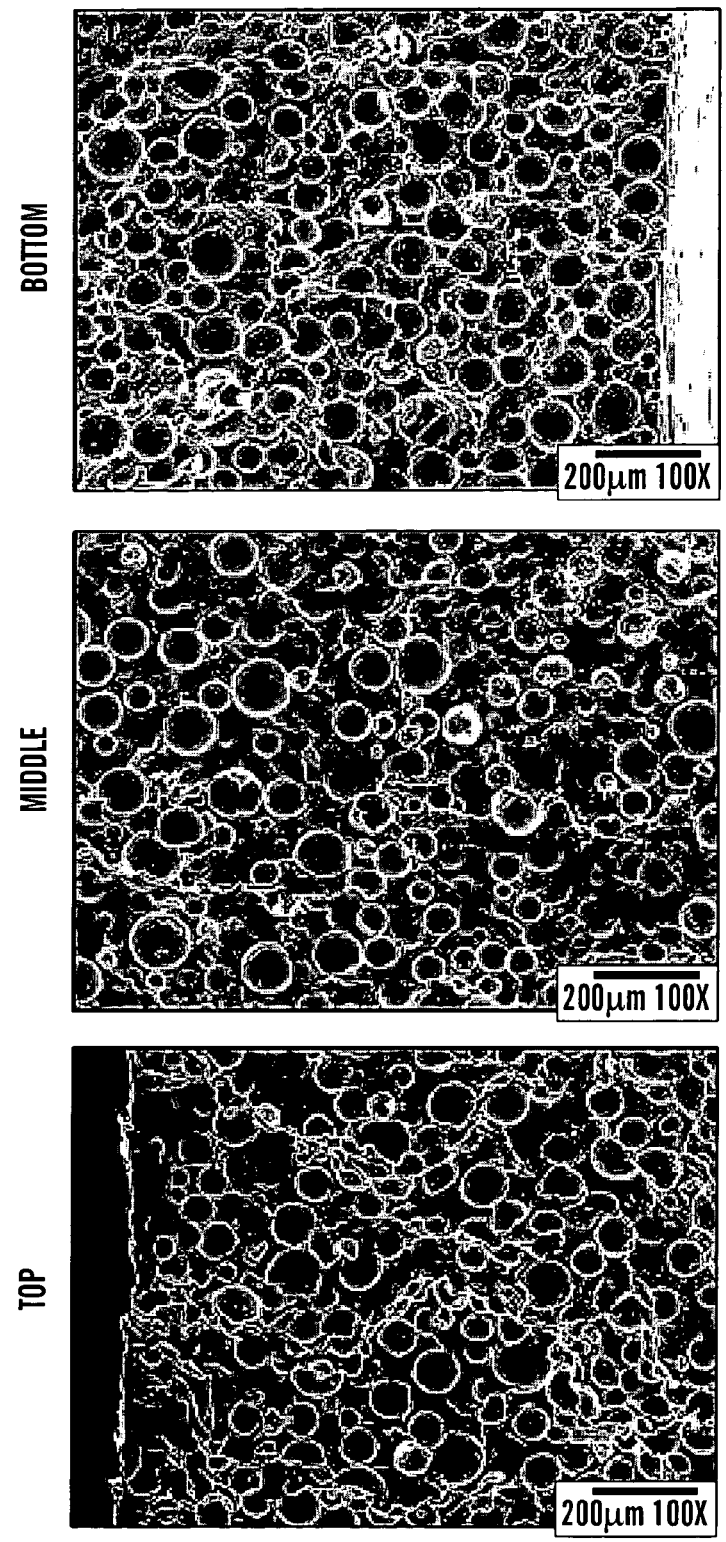
FIG. 17 is a micrograph showing top, middle, and bottom views of syntactic foam composed of 3M™ K1 glass microspheres embedded in GE RTV615 silicone at a magnification of 100×. Snapshots were taken along the thickness of the sample.
Figure 18:
FIG. 18 is a micrograph showing currently used foamed neoprene at a magnification of 50×, portraying internal air cells.
Figure 19:
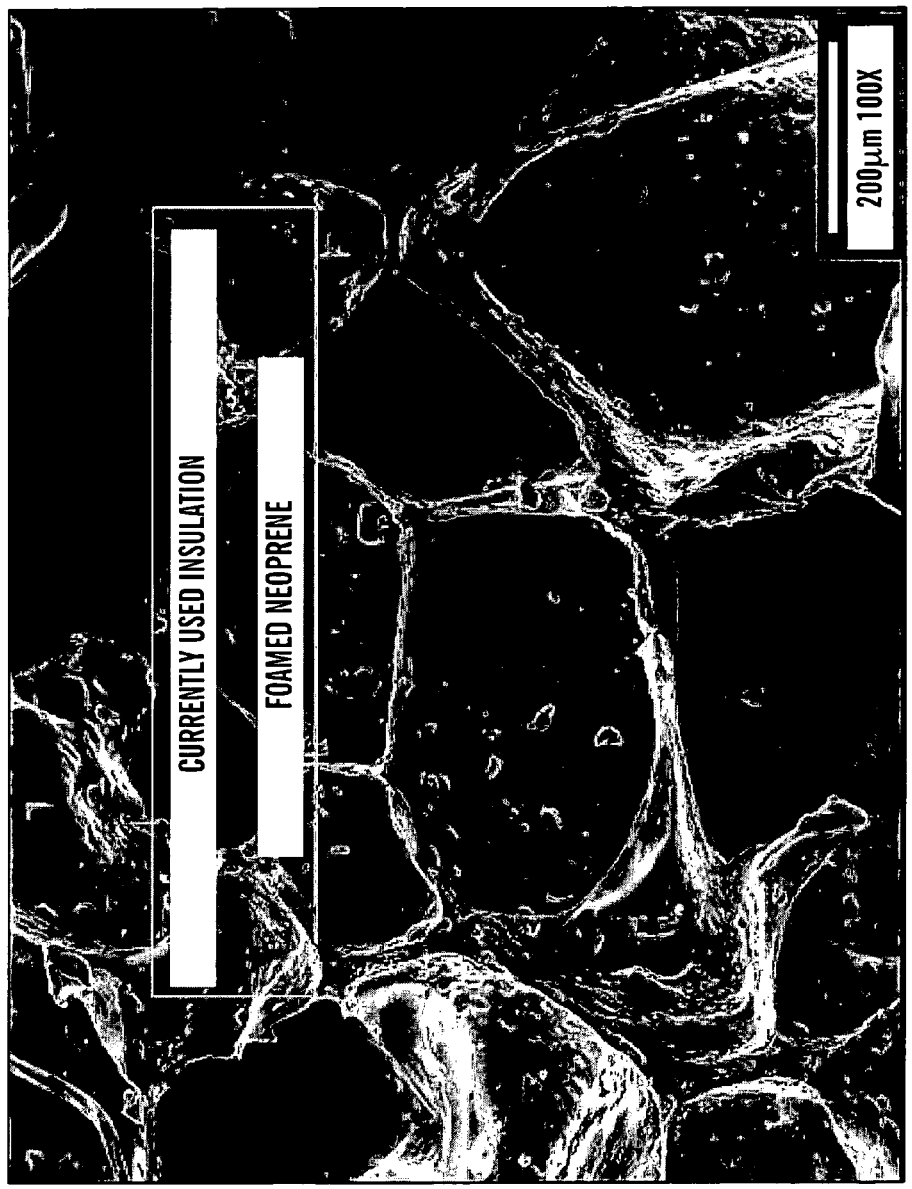
FIG. 19 is a micrograph showing currently used foamed neoprene at a magnification of 100×, portraying internal air cells.
Figure 20:
FIG. 20 is a micrograph showing currently used foamed neoprene at the nylon laminate interface surface at a magnification of 35×.

FIG. 16 is a graph showing an experimentally determined stress (MPa)-strain (m/m) curve (stretchability) for various candidate materials compared to nylon laminated and unlaminated foamed neoprene. The graph shows that GE LIM6010 displays stretchability similar to that of foamed neoprene. On the other hand, GE RTV615 has very sharp slopes, indicating that the material is stiff in comparison to foamed neoprene. FIG. 17 is a micrograph showing cross-section views of the top, middle, and bottom portions of the GE RTV 615 (containing 3M™ K1 microspheres) candidate insulation. FIGS. 18–20 are micrographs showing foamed neoprene at various magnifications. FIG. 18 shows the foamed neoprene at a magnification of 50× and exhibiting internal air cells. FIG. 19 shows the foamed neoprene at a magnification of 100× and exhibiting internal air cells. FIG. 20 shows the foamed neoprene at the nylon laminate interface surface at a magnification of 35×

Figure 21:
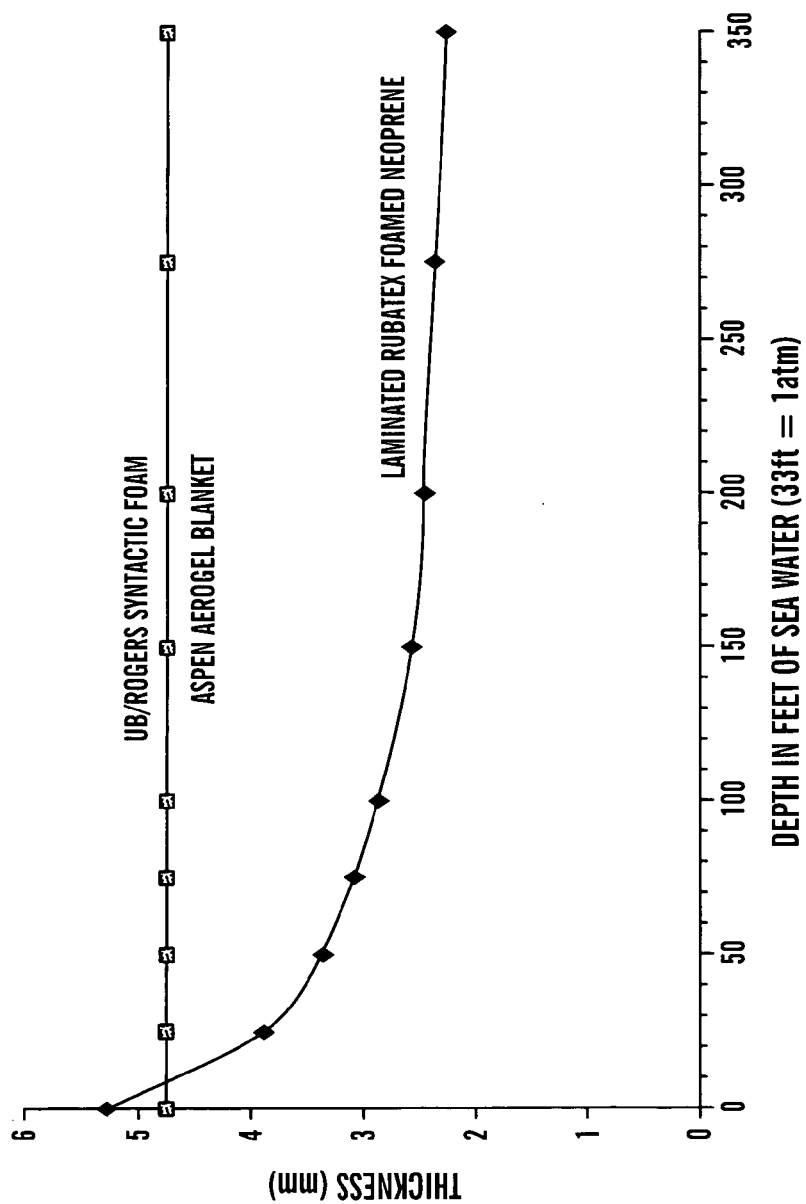
FIG. 21 is a graph showing the experimentally measured change in thickness (inches) of syntactic foam, foamed neoprene, and aerogel relative to hydrostatic pressure.

FIG. 21 is a graph showing the experimentally measured change in thickness (inches) of syntactic foam, foamed neoprene, and aerogel in relation to increasing pressure in depth of sea water (feet). The graph illustrates the incompressibility of syntactic foam and aerogel compared to the compressibility of foamed neoprene.

Figure 22:
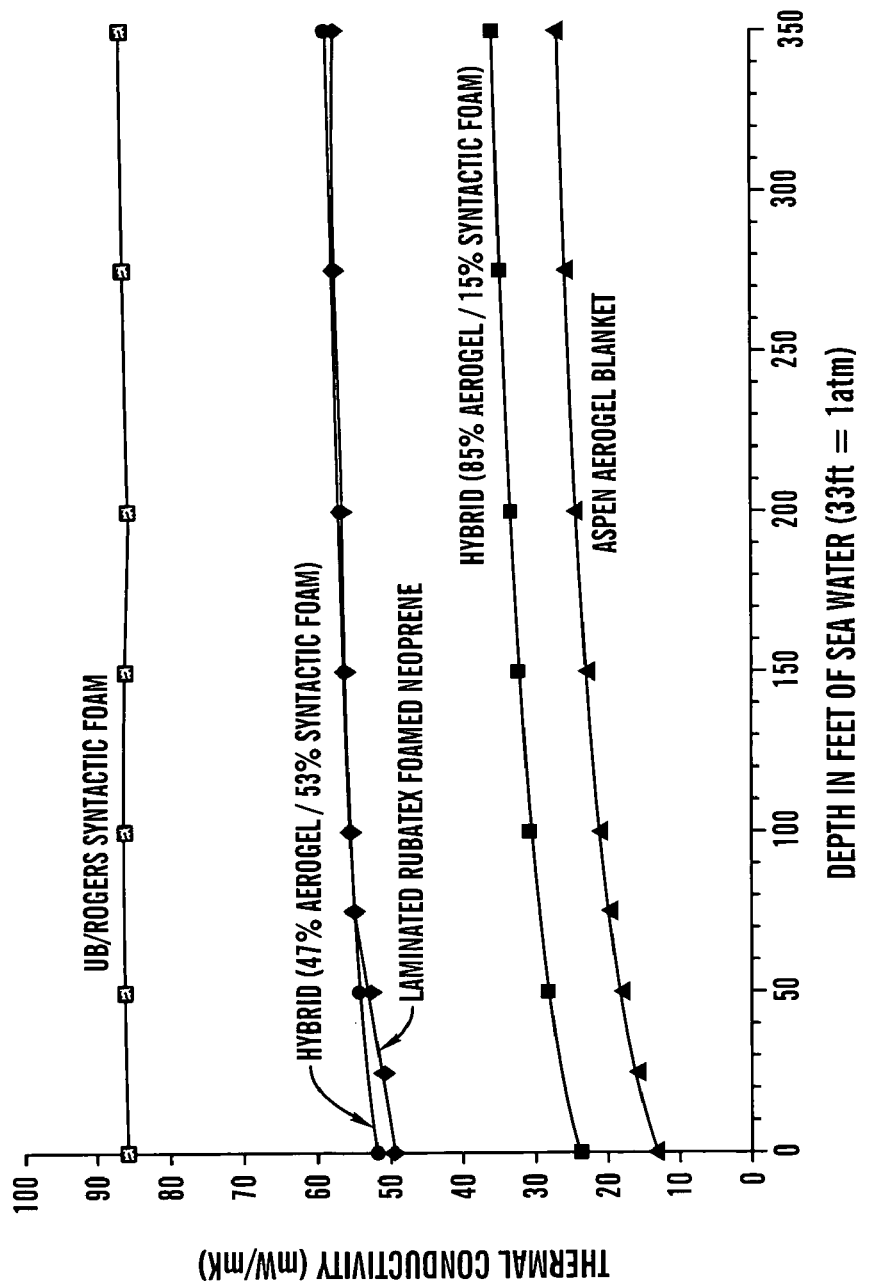
FIG. 22 is a graph showing the change in thermal conductivity (W/mK) relative to hydrostatic pressure.

FIG. 22 is a graph showing the change in thermal conductivity (W/mK) in relation to increasing pressure in depth of sea water (feet) of various candidate materials. The graph displays experimentally measured results for foamed neoprene, ASPEN™ aerogel, and syntactic foam verses the predicted behavior of the hybrid insulation at different volume content of aerogel. RUBATEX™ foamed neoprene increases in thermal conductivity due to the compression of the gas cells. At a depth of approximately 135 ft the thermal conductivity surpasses that of pure syntactic foam. ASPEN™ aerogel, on the other hand has a thermal conductivity approximately four times lower than foamed neoprene at the surface. Although this value increases at depth (350 feet of sea water) it does not surpass approximately 60% of the value of foamed neoprene at atmospheric pressure. The hybrid insulation shows a decrease of thermal conductivity with increased aerogel content. At 47% aerogel the hybrid insulation is approximately equal to the thermal conductivity of foamed neoprene. At 85% aerogel content, the thermal conductivity is approximately half the value of foamed neoprene at atmospheric pressure.

From the foregoing, it is expected that the composite insulation materials of the present invention will be superior to foamed neoprene.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A composite insulation material comprising:
a syntactic foam component and
a plurality of aerogel inserts embedded within said syntactic foam component, wherein said composite insulation material has opposed first and second surfaces and comprises a plurality of incisions and/or indentations formed into the first surface and/or the second surface, or extending between the first and second surfaces.

2. The composite insulation material according to claim 1, wherein said syntactic foam component comprises an elastomeric matrix and a filler dispersed substantially throughout said elastomeric matrix.

3. The composite insulation material according to claim 2, wherein said elastomeric matrix is selected from the group consisting of silicone and rubber.

4. The composite insulation material according to claim 2, wherein said elastomeric matrix further comprises a plasticizer.

5. The composite insulation material according to claim 4, wherein said plasticizer is present in an amount by volume of between about 5 and about 50 percent.

6. The composite insulation material according to claim 4, wherein said plasticizer is polymethylsiloxane.

7. The composite insulation material according to claim 2, wherein said filler comprises a plurality of microspheres.

8. The composite insulation material according to claim 7, wherein said plurality of microspheres are present in an amount by volume of between about 10 and about 70 percent.

9. The composite insulation material according to claim 7, wherein said microspheres are selected from the group consisting of glass microspheres, plastic microspheres, and a combination of glass and plastic microspheres.

10. The composite insulation material according to claim 7, wherein said microspheres have a diameter of between about 20 and about 5,000 micrometers.

11. The composite insulation material according to claim 1, wherein said syntactic foam component comprises an elastomeric matrix and a plurality of microspheres, wherein said elastomeric matrix comprises silicone and a plasticizer.

12. The composite insulation material according to claim 1, wherein said plurality of aerogel inserts are partially embedded within said syntactic foam component.

13. The composite insulation material according to claim 1, wherein said plurality of aerogel inserts are fully embedded within said syntactic foam component.

14. The composite insulation material according to claim 1, wherein each of said aerogel inserts comprises synthetic amorphous silica.

15. The composite insulation material according to claim 14, wherein said plurality of aerogel inserts are present in an amount by volume of between about 40 percent and about 90 percent.

16. The composite insulation material according to claim 14, wherein said plurality of aerogel inserts are non-uniformly embedded within said syntactic foam component.

17. The composite insulation material according to claim 14, wherein said plurality of aerogel inserts are uniformly embedded within said syntactic foam component.

18. The composite insulation material according to claim 1 further comprising:
a first laminate layer substantially covering the first surface of said composite insulation; or
a second laminate layer substantially covering the opposed second surface of said composite insulation material; or
a first laminate layer substantially covering the first surface of said composite insulation material and a second laminate layer substantially covering the opposed second surface of said composite insulation material.

19. The composite insulation material according to claim 18, wherein said first and second laminate layers are the same or different and each comprises a nylon/spandex laminating compound, a lycra laminating compound, or a neoprene rubber laminating compound.

20. The composite insulation material according to claim 18 further comprising:
a first adhesive layer between said first laminate layer and said first surface of said composite insulation material; or
a second adhesive layer between said second laminate layer and said second surface of said composite insulation material; or
a first adhesive layer between said first laminate layer and said first surface of said composite insulation material and a second adhesive layer between said second laminate layer and said second surface of said composite insulation material.

21. The composite insulation material according to claim 20, wherein said first and second adhesive layers are the same or different and each comprises a silicone-based adhesive.

22. The composite insulation material according to claim 20, wherein said first and second adhesive layers each has a thickness of between about 200 and about 500 micrometers.

23. The composite insulation material according to claim 18, wherein each of said first and second laminate layers has a thickness of between about 200 and about 500 micrometers.

24. The composite insulation material according to claim 18 further comprising a fluid impervious membrane between said first surface and said first laminate layer.

25. The composite insulation material according to claim 18 further comprising a fluid impervious membrane between said second surface and said second laminate layer.

26. The composite insulation material according to claim 18, wherein said syntactic foam component has a thickness of between about 2 and about 25 millimeters.

27. The composite insulation material according to claim 18, wherein said composite insulation material has a thickness of between about 2 and about 25 millimeters.

28. The composite insulation material according to claim 1, wherein said composite insulation material has a thickness of between about 2 and about 25 millimeters.

29. The composite insulation material according to claim 1, wherein said plurality of incisions and/or indentations are at a depth of between about 10 and about 100 percent of the thickness of said composite insulation material.

30. The composite insulation material according to claim 1, wherein each of said plurality of incisions and/or indentations has a width of not greater than about 25 times the thickness of said composite insulation material.

31. The composite insulation material according to claim 1, wherein said plurality of incisions and/or indentations comprise incisions and/or indentations of non-uniform depth and width.

32. The composite insulation material according to claim 1, wherein said plurality of incisions and/or indentations are arranged in a uniform array.

33. The composite insulation material according to claim 1, wherein said plurality of incisions and/or indentations are arranged in a non-uniform array.

34. The composite insulation material according to claim 1, wherein each of said plurality of incisions and/or indentations has the same shape.

35. The composite insulation material according to claim 1, wherein said plurality of incisions and/or indentations comprise at least two different shapes of incisions and/or indentations.

36. The composite insulation material according to claim 1, wherein said composite insulation material has a thermal conductivity of between about 10 and about 50 mW/m-K at a depth of up to about 350 feet of sea water.

37. The composite insulation material according to claim 1, wherein said composite insulation material has a drapeability parameter of between about 0.07 and about 3.36 g-m, as measured using Federal Test Method Standard Number 191A Method 5206.

38. The composite insulation material according to claim 1, wherein said composite insulation material has a tensile strength of between about 0.07 and about 2.20 MPa, as measured using ASTM D412-98a.

39. The composite insulation material according to claim 1, wherein said composite insulation material has a tear strength of between about 0.36 and about 17.60 kN/M, as measured using ASTM D624-00.

40. The composite insulation material according to claim 1, wherein said composite insulation material has an elastic modulus of between about 0.01 and about 0.22 MPa at an elongation of about 50 percent, between about 0.02 and about 0.25 MPa at about 100 percent elongation, or between about 0.02 and about 0.29 MPa at about 200 percent elongation, as measured using ASTM D412-98a.

41. The composite insulation material according to claim 1, wherein said composite insulation material has a specific weight of between about 0.25 and about 0.70.

42. The composite insulation material according to claim 1, wherein said composite insulation material has a density of between about 250 kg/m$^3$ and about 750 kg/m$^3$.

43. An article of clothing comprising the composite insulation material according to claim 1.

44. The article of clothing according to claim 43, wherein said article is a dive suit.

45. A pipeline comprising the composite insulation material according to claim 1.

46. A composite insulation material having opposed first and second surfaces, and comprising a syntactic foam component and a plurality of aerogel inserts embedded within the syntactic foam component, wherein said composite insulation material has opposed first and second surfaces and comprises a plurality of incisions and/or indentations formed into the first surface and/or the second surface, or extending between the first and second surfaces, said composite insulation material being made according to a method comprising the following steps:
(j) providing a syntactic foam component,
embedding a plurality of aerogel inserts within the syntactic foam component to form the composite insulation material, and
introducing a plurality of incisions and/or indentations into the first and/or second surfaces of the composite insulation material; or
(ii) providing a syntactic foam component precursor,
inserting a plurality of aerogel inserts within the syntactic foam component precursor,
curing the syntactic foam component precursor to form the composite insulation material, and
introducing a plurality of incisions and/or indentations into the first and/or second surfaces of the composite insulation material.

* * * * *

UNITED STATES PATENT AND TRADEMARK OFFICE
CERTIFICATE OF CORRECTION

| | | |
|---|---|---|
| PATENT NO. | : 7,101,607 B2 | Page 1 of 1 |
| APPLICATION NO. | : 10/645726 | |
| DATED | : September 5, 2006 | |
| INVENTOR(S) | : Mollendorf et al. | |

It is certified that error appears in the above-identified patent and that said Letters Patent is hereby corrected as shown below:

On Title Page
Item (75) Inventors, fifth line, delete "North" and insert --Kenmore, NY-- in its place
Item (75) Inventors, sixth line, delete "Tonawanda, NY"

Signed and Sealed this

Twenty-eighth Day of November, 2006

JON W. DUDAS
*Director of the United States Patent and Trademark Office*